(12) United States Patent
Teyeb et al.

(10) Patent No.: US 9,131,495 B2
(45) Date of Patent: Sep. 8, 2015

(54) ENHANCED ADMISSION CONTROL IN RELAY-ENHANCED ACCESS NETWORKS

(75) Inventors: Oumer Teyeb, Stockholm (SE); Bernhard Raaf, Neuried (DE); Simone Redana, Munich (DE); Wei Hua Zhou, Beijing (CN); Min Huang, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 257 days.

(21) Appl. No.: 13/638,811

(22) PCT Filed: Mar. 30, 2010

(86) PCT No.: PCT/EP2010/054193
§ 371 (c)(1),
(2), (4) Date: Feb. 20, 2013

(87) PCT Pub. No.: WO2011/120559
PCT Pub. Date: Oct. 6, 2011

(65) Prior Publication Data
US 2013/0143574 A1    Jun. 6, 2013

(51) Int. Cl.
*H04W 36/00* (2009.01)
*H04W 72/04* (2009.01)
*H04B 7/26* (2006.01)
*H04W 84/04* (2009.01)
*H04W 28/06* (2009.01)
*H04W 74/00* (2009.01)

(52) U.S. Cl.
CPC ........ *H04W 72/044* (2013.01); *H04W 36/0011* (2013.01); *H04W 36/0055* (2013.01); *H04B 7/2606* (2013.01); *H04W 28/06* (2013.01); *H04W 74/004* (2013.01); *H04W 84/047* (2013.01)

(58) Field of Classification Search
None
See application file for complete search history.

(56) References Cited

U.S. PATENT DOCUMENTS

| | | | |
|---|---|---|---|
| 6,931,253 B1* | 8/2005 | Hartikainen et al. | 455/450 |
| 2008/0113667 A1* | 5/2008 | Seidel et al. | 455/434 |
| 2009/0163220 A1 | 6/2009 | Liu et al. | 455/452.1 |
| 2009/0323581 A1 | 12/2009 | Masuda | 370/315 |

OTHER PUBLICATIONS

Schultz, Daniel, et al., "Relaying Concepts and Supporting Actions in the Context of CGs", Oct. 31, 2006, IST-4-027756 Winner II, 2 pgs.

(Continued)

*Primary Examiner* — Suhail Khan
(74) *Attorney, Agent, or Firm* — Harrington & Smith

(57) ABSTRACT

There are provided measures for enhanced admission control in relay-enhanced access networks, said measures exemplarily including receipt of a bearer admission request of at least one bearer in a relay-enhanced access network, said at least one bearer consisting of a bearer on an access link between a user equipment and a relay node and a bearer on a backhaul link between said relay node and a base station, and execution of a combined bearer admission control of said at least one bearer at one of said relay node and said base station, including a bearer admission control on the access link and a bearer admission control on the backhaul link. Said measures may exemplarily be applied for enhancing admission control in relay-enhanced LTE and LTE-Advanced access networks.

23 Claims, 13 Drawing Sheets

(56) References Cited

OTHER PUBLICATIONS

Teyeb, Oumer, et al., "Handover Framework for Relay Enhanced LTE Networks", © 2009 IEEE, 5 pgs.

3GPP TR 36.806 V0.2.2 (Feb. 2010), $3^{rd}$ Generation Partnership Project; Technical Specification Group Radio Access Network; Evolved Universal Terrestrial Radio Access (E-UTRA); Relay architectures for E-UTRA (LTE-Advanced) (Release 9), 29 pgs.

* cited by examiner

ENHANCED ADMISSION CONTROL IN RELAY-ENHANCED ACCESS NETWORKS

FIELD OF THE INVENTION

The present invention relates to enhanced admission control in relay-enhanced access networks.

BACKGROUND OF THE INVENTION

In the development of radio communication systems, such as mobile communication systems (like for example GSM (Global System for Mobile Communication), GPRS (General Packet Radio Service), UMTS (Universal Mobile Telecommunication System) or the like), efforts are made for an evolution of the radio access part thereof. In this regard, the evolution of radio access networks (like for example the GSM EDGE radio access network (GERAN) and the Universal Terrestrial Radio Access Network (UTRAN) or the like) is currently addressed. Such improved radio access networks are sometimes denoted as evolved radio access networks (like for example the Evolved Universal Terrestrial Radio Access Network (E-UTRAN)) or as being part of a long-term evolution (LTE) or LTE-Advanced. Although such denominations primarily stem from 3GPP (Third Generation Partnership Project) terminology, the usage thereof hereinafter does not limit the respective description to 3GPP technology, but generally refers to any kind of radio access evolution irrespective of the underlying system architecture. Another example for an applicable broadband access system may for example be IEEE 802.16 also known as WiMAX (Worldwide Interoperability for Microwave Access).

In the following, for the sake of intelligibility, LTE (Long-Term Evolution according to 3GPP terminology) or LTE-Advanced is taken as a non-limiting example for a broadband radio access network being applicable in the context of the present invention and its embodiments. However, it is to be noted that any kind of radio access network may likewise be applicable, as long as it exhibits comparable features and characteristics as described hereinafter.

In the context of LTE and LTE-Advanced (i.e. in the context of release 8 and release 10 specifications) and even beyond in later releases, mechanisms for admission control are specified e.g. for handover, bearer setup and bearer modification purposes.

FIG. 1 shows a signaling diagram of an admission control procedure for handover preparation in accordance with LTE and LTE-Advanced.

As shown in FIG. 1, in handover preparation for a user equipment UE, a source base station eNB takes, based on measurement reports it gets from the UE, a handover decision to handover the UE towards a target base station eNB. Then, the source eNB, i.e. the base station which presently serves the UE, sends a handover (HO) request towards the target eNB, i.e. the base station which is to serve the UE after the handover. The target eNB performs admission control for the UE, and acknowledges the handover request towards the source eNB. Then, the source eNB may, after uplink (UL) resources having already been allocated, allocate downlink (DL) resources, and perform radio resource control (RRC) including mobility control information towards the UE.

In the development of cellular systems in general, and access networks in particular, relaying has been proposed as one concept. In relaying, a user equipment or terminal (UE) is not directly connected with an access node such as a radio base station (e.g. denoted as eNodeB or eNB) of a radio access network (RAN), but via a relay node (RN). Relaying by way of RNs has been proposed as a concept for coverage extension in cellular systems. Apart from this main goal of coverage extension, introducing relay concepts can also help in providing high-bit-rate coverage in high shadowing environments, reducing the average radio-transmission power at the a user equipment (thereby leading to long battery life), enhancing cell capacity and effective throughput, (e.g. increasing cell-edge capacity and balancing cell load), and enhancing overall performance and deployment cost of radio access networks.

FIG. 2 shows a schematic diagram of a typical deployment scenario of a relay-enhanced access network, such as e.g. a Long Term Evolution (LTE) RAN with radio-relayed extensions. As shown in FIG. 1, UEs at disadvantaged positions such as a cell edge and/or high shadowing areas are connected to a so-called donor base station (DeNB) via a respective RN. The link between DeNB and RN may be referred to as backhaul link, relay link or Un link, and the link between RN and UE may be referred to as access link or Uu link.

A UE Evolved Packet System (EPS) bearer may be considered as a virtual connection between a core network (CN) and the UE, which is characterized by different quality of service (QoS) parameters, and as such the traffic belonging to this bearer will be treated according to these parameters on the different nodes between the gateways and the UE. On the other hand, RN bearers, also referred to as Un bearers, are defined between the RN and DeNB. The mapping of UE EPS bearers and RN bearers can be done either one-to-one (where there is one Un bearer for each UE EPS bearer), or many-to-one (where several UE EPS bearers are mapped into one Un bearer). The many-to-one mapping can be based on mapping criteria such as the QoS requirements or can be done on a per UE basis (i.e. one Un bearer for all bearers of a given UE, regardless of QoS).

In the context of LTE and LTE-Advanced, a Layer 3 (L3) RN, also referred to as Type I RN, is currently taken as a baseline case for the study on relay extensions. Currently, four options for candidate relay architectures are conceivable, the details thereof being out of scope of the present invention. The four candidate relay architectures may be grouped into two categories.

In a relay architecture of a first category, the DeNB is not aware of the individual UE EPS bearers. That is, the relayed UEs are hidden from the DeNB, and the DeNB is aware of only the RNs with which the relayed UEs are connected. Thus, in such a relay architecture only many-to-one mapping is supported, and specifically QoS based mapping (assuming the QoS mapping is done in a node before the DeNB through a marking of the IP headers Type of Service (TOS) field, for example, in accordance with the a QoS parameter such as Quality of Service class identifier (QCI)).

In a relay architecture of a second category, the DeNB is aware of the individual UE EPS bearers of all of the relayed UEs. That is, the DeNB is aware of the relayed UEs as well as of the RNs with which the relayed UEs are connected. Thus, in such relay architecture, it is possible to support both many-to-one (including per UE based mapping) and one-to-one mapping, and the mapping can be done at the DeNB itself, as the UE EPS bearer's information is visible at the DeNB. Even if many-to-one mapping is used, a more appropriate mapping can be employed in the second category architecture as compared with the first category because all the QoS parameters (in addition to the QCI) can be used in the mapping process. In this case it is possible for example to map bearers of different UEs with similar QoS requirements to a Un bearer that fits these QoS requirements.

The split of resources between the DeNB-RN link and the RN-UE link may be done dynamically or semi-dynamically depending on the number of UEs connected to the DeNB and to the RNs. In the following, centralized resource partitioning is assumed, where the DeNB assigns the resources that each RN connected to it can use to serve its connected UEs. The user scheduling is done at the RNs assuming only the resources assigned by the DeNB are available. Yet, it is noted that distributed resource partitioning may be equally used as well.

In the context of LTE and LTE-Advanced with relaying, no mechanisms for admission control, e.g. for handover, bearer setup and bearer modification purposes, are specified so far. The mechanisms for admission control specified for release 8 as outlined above are not properly and efficiently applicable in such a relay-based deployment scenario.

In particular, the use of admission control mechanisms of release 8 would, in such a relay-based deployment scenario, incur additional delays and additional signaling overhead. Also, additional delay and additional signaling overhead would be incurred, if admission control for certain resources fails. These drawbacks are specifically adverse due to the fact that the frequency of handovers (and, thus, the frequency of required bearer admission control procedures) is increased with the introduction of relay nodes, as well as the fact that the multi-hop nature of the connection between user equipment and base station increases delay and signaling overhead anyway.

Accordingly, the requirements for handovers and other bearer setup or modification procedures according to LTE or LTE-Advanced may not be met in a relay-based deployment scenario when applying conventional admission control mechanisms.

Accordingly, a feasible solution does not exist for facilitating efficient admission control in relay-enhanced access networks.

SUMMARY OF EMBODIMENTS OF THE INVENTION

The present invention and its embodiments aim at solving the above problems.

The present invention and its embodiments are made to provide for a feasible solution for facilitating efficient admission control in relay-enhanced access networks.

According to an exemplary first aspect of the present invention, there is provided a method comprising receiving a bearer admission request of at least one bearer in a relay-enhanced access network, the at least one bearer consisting of a bearer on an access link between a user equipment and a relay node and a bearer on a backhaul link between the relay node and a base station, and executing a combined bearer admission control of the at least one bearer at one of the relay node and the base station, including a bearer admission control on the access link and a bearer admission control on the backhaul link.

According to further developments or modifications thereof, one or more of the following applies:

the bearer admission control on the access link comprises obtaining information on available resources on the access link, and checking whether sufficient access link resources for admitting the at least one bearer on the access link are available and/or are to be made available by dropping one or more existing bearers on the access link having a lower priority than at least one bearer requested for admission and/or by dropping one or more existing bearers on the backhaul link having a lower priority than at least one bearer requested for admission, the bearer admission control on the access link further comprises, when sufficient access link resources are not available, but are to be made available, marking those one or more bearers to be dropped, admitting the at least one bearer on the access link, and updating resources on the backhaul link which are to be freed by the dropping, and/or, when sufficient access link resources are available and/or are to be made available, admitting the at least one bearer on the access link, and/or, when sufficient access link resources are not available, and are not to be made available, rejecting admission of the at least one bearer, the bearer admission control on the backhaul link comprises obtaining information on available resources on the backhaul link, and checking whether sufficient backhaul link resources for admitting the at least one bearer on the backhaul link are available and/or are to be made available by reconfiguring backhaul resources after completion of the bearer admission on the backhaul link and/or by dropping one or more existing bearers on the access link having a lower priority than at least one bearer requested for admission and/or by dropping one or more existing bearers on the backhaul link having a lower priority than at least one bearer requested for admission, the bearer admission control on the backhaul link further comprises, when sufficient backhaul link resources are not available, and are not to be made available by the reconfiguring, but are to be made available by the dropping, dropping the one or more existing bearers on the access link and/or dropping the one or more existing bearers on the backhaul link, admitting the at least one bearer on the backhaul link, and/or, when sufficient backhaul link resources are available and/or are to be made available by the reconfiguring, admitting the at least one bearer on the backhaul link, and/or, when sufficient backhaul link resources are not available, and are not to be made available, rejecting admission of the at least one bearer, the checking comprises estimating an amount of backhaul link resources being able to be made available by dropping one or more existing bearers on the access link having a lower priority than at least one bearer requested for admission, the combined bearer admission control is executed at the relay node, and the obtaining the information on available access link resources comprises measuring the information between the relay node and the user equipment, and/or the obtaining the information on available backhaul link resources comprises receiving the information from the base station, the combined bearer admission control is executed at the base station, and the obtaining the information on available backhaul link resources comprises measuring the information between the base station and the relay node, and/or the obtaining the information on available access link resources comprises receiving the information from the relay node, the combined bearer admission control is executed at the base station, and the method further comprises receiving from the relay node and caching mobility control information relating to the user equipment, and sending a modified bearer admission request including a result of bearer admission control at the base station to the relay node, the method further comprises sending an update message including a result of bearer admission control for the access link and/or the backhaul link to the other one of the relay node and the base station, and/or reconfiguring backhaul resources at the base station after completion of the bearer admission on the backhaul link and/or after completion of the bearer admission on the access link, for each one of the at least one bearer requested for admission, the bearer admission control on the access link and the bearer admission control on the backhaul link are executed in an arbitrary order, when a bearer admission for more than one bearer is requested, the method further comprises prioritizing the bearers requested for admission and executing the combined bearer admission control in the order of prioritization of the bearers, and/or the combined bearer admission control for the bearers requested for admission is executed either in a successive manner for one bearer at a time or in a joint manner for more than one or all of the bearers at a time, the information on available resources on the access link and/or the information on available resources on the backhaul link comprise a range of resources wherein an actual value of available resources lies within the range, and respective resource information are obtained only when the actual value of available resources on the access link and/or backhaul link is outside the range, and/or sufficiency of respective resources is checked and bearer admission on the respective link is executed on the basis of the range, the bearer admission request comprises or is comprised in at least one of a handover request, a bearer setup request and a bearer modification request, and/or the relay node and the base station are part of an evolved radio access network in accordance with LTE and/or LTE-Advanced specifications.

According to an exemplary second aspect of the present invention, there is provided an apparatus comprising a receiver configured to receive a bearer admission request of at least one bearer in a relay-enhanced access network, the at least one bearer consisting of a bearer on an access link between a user equipment and a relay node and a bearer on a backhaul link between the relay node and a base station, and a bearer admission control processor configured to execute a combined bearer admission control of the at least one bearer, including a bearer admission control on the access link and a bearer admission control on the backhaul link.

According to further developments or modifications thereof, one or more of the following applies:

the bearer admission control processor, for bearer admission control on the access link, is configured to obtain information on available resources on the access link, and check whether sufficient access link resources for admitting the at least one bearer on the access link are available and/or are to be made available by dropping one or more existing bearers on the access link having a lower priority than at least one bearer requested for admission and/or by dropping one or more existing bearers on the backhaul link having a lower priority than at least one bearer requested for admission, the bearer admission control processor, for bearer admission control on the access link, is further configured to, when sufficient access link resources are not available, but are to be made available, mark those one or more bearers to be dropped, admit the at least one bearer on the access link, and update resources on the backhaul link which are to be freed by the dropping, and/or, when sufficient access link resources are available and/or are to be made available, admit the at least one bearer on the access link, and/or, when sufficient access link resources are not available, and are not to be made available, reject admission of the at least one bearer, the bearer admission control processor, for bearer admission control on the backhaul link, is configured to obtain information on available resources on the backhaul link, and check whether sufficient backhaul link resources for admitting the at least one bearer on the backhaul link are available and/or are to be made available by reconfiguring backhaul resources after completion of the bearer admission on the backhaul link and/or by dropping one or more existing bearers on the access link having a lower priority than at least one bearer requested for admission and/or by dropping one or more existing bearers on the backhaul link having a lower priority than at least one bearer requested for admission, the bearer admission control processor, for bearer admission control on the backhaul link, is further configured to, when sufficient backhaul link resources are not available, and are not to be made available by the reconfiguring, but are to be made available by the dropping, drop the one or more existing bearers on the access link and/or drop the one or more existing bearers on the backhaul link, admit the at least one bearer on the backhaul link, and/or, when sufficient backhaul link resources are available and/or are to be made available by the reconfiguring, admit the at least one bearer on the backhaul link, and/or, when sufficient backhaul link resources are not available, and are not to be made available, reject admission of the at least one bearer, the bearer admission control processor is configured to estimate an amount of backhaul link resources being able to be made available by dropping one or more existing bearers on the access link having a lower priority than the at least one bearer requested for admission, the apparatus is operable as or at the relay node, and the apparatus is configured to measure the information on available access link resources between the relay node and the user equipment, and/or receive the information on available backhaul link resources from the base station, the apparatus further comprises a transmitter configured to send an update message including a result of bearer admission control for the access link and/or the backhaul link to the base station, the apparatus is operable as or at the base station, and the apparatus is configured to measure the information on available backhaul link resources between the base station and the relay node, and/or receive the information on available access link resources from the relay node, the apparatus is operable as or at the base station, and the apparatus is configured to receive from the relay node and cache mobility control information relating to the user equipment, and send a modified bearer admission request including a result of bearer admission control at the base station to the relay node, the apparatus further comprises a transmitter configured to send an update message including a result of bearer admission control for the access link and/or the backhaul link to the relay node, and/or a reconfiguration processor configured to reconfigure backhaul resources after completion of the bearer admission on the backhaul link and/or on the access link, the bearer admission control processor is configured to execute, for each one of the at least one bearer requested for admission, the bearer admission control on the access link and the bearer admission control on the backhaul link in an arbitrary order, the bearer admission control processor is configured to, when a bearer admission for more than one bearer is requested, prioritize the bearers requested for admission and execute the combined bearer admission control in the order of prioritization of the bearers, and/or execute the combined bearer admission control for the bearers requested for admission either in a successive manner for one bearer at a time or in a joint manner for more than one or all of the bearers at a time, the information on available resources on the access link and/or the information on available resources on the backhaul link comprise a range of resources wherein an actual value of available resources lies within the range, and the bearer admission control processor is configured to obtain respective resource information only when the actual value of available resources on the access link and/or backhaul link is outside the range, and/or check sufficiency of respective resources and execute bearer admission on the respective link on the basis of the range, the bearer admission request comprises or is comprised in at least one of a handover request, a bearer setup request and a bearer modification request, and/or the apparatus is part of an evolved radio access network in accordance with LTE and/or LTE-Advanced specifications.

According to an exemplary third aspect of the present invention, there is provided a computer program product including a program comprising software code portions being arranged, when run on a processor of an apparatus (such as e.g. according to the above second aspect and/or developments or modifications thereof), to perform the method according to the above first aspect and/or developments or modifications thereof.

According to further developments or modifications thereof, the computer program product comprises a computer-readable medium on which the software code portions are stored, and/or the program is directly loadable into a memory of the processor.

By way of exemplary embodiments of the present invention, there are provided mechanisms and measures for enhancing admission control in relay-enhanced access networks, which may ensure acceptable delay and signaling overhead.

By way of exemplary embodiments of the present invention, admission control in relay-enhanced access networks may be accomplished with less delay and/or less signaling overhead.

By way of exemplary embodiments of the present invention, the admission control is applicable for handover, bearer setup and/or bearer modification, and/or the relay-enhanced access network may be based on LTE/LTE-Advanced specifications, such as e.g. an E-UTRAN.

BRIEF DESCRIPTION OF THE DRAWINGS

In the following, the present invention will be described in greater detail by way of non-limiting examples with reference to the accompanying drawings, in which.

DETAILED DESCRIPTION OF EMBODIMENTS
OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

In particular, the present invention and its embodiments are mainly described in relation to 3GPP specifications being used as non-limiting examples for certain exemplary network configurations and deployments. In particular, an LTE (E-UTRAN) radio access network and corresponding standards (Release-8, Release-9, and LTE-Advanced) are used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

In particular, embodiments of the present invention may be applicable in any relay-enhanced (cellular) system with a need for signaling optimization. Embodiments of the present invention may be applicable for/in any kind of modern and future communication network including any conceivable mobile/wireless communication networks according to 3GPP (Third Generation Partnership Project) or IETF (Internet Engineering Task Force) specifications.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

In the following, exemplary embodiments of the present invention are described with reference to methods, procedures and functions, as well as with reference to structural arrangements and configurations.

Figure 3:
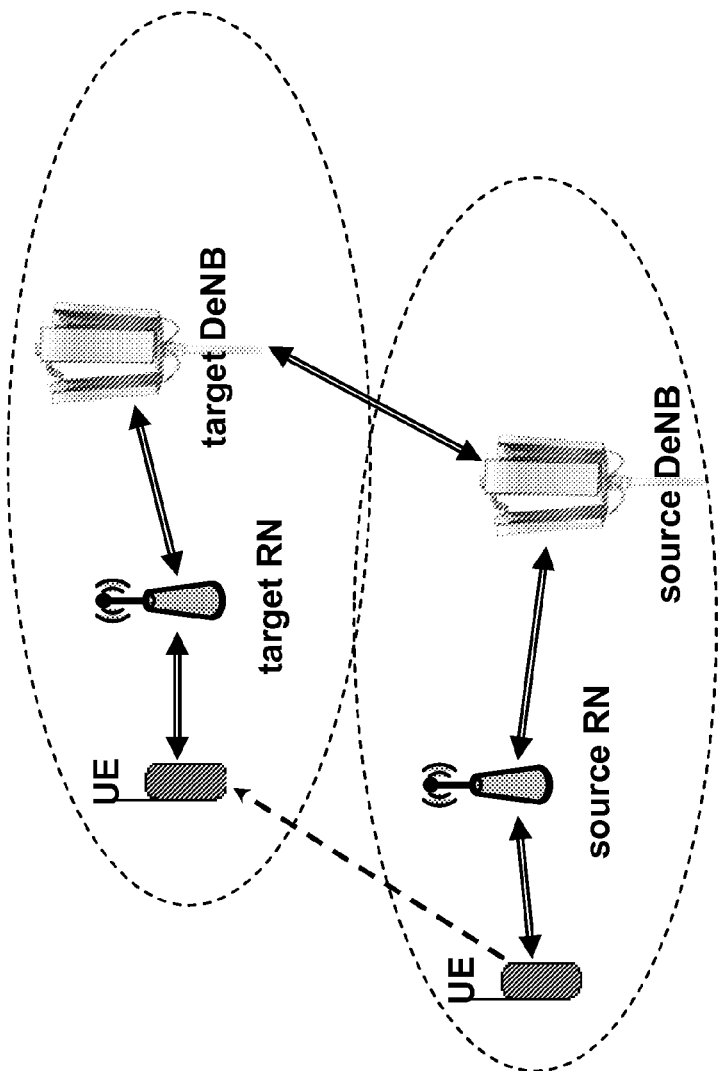
FIG. 3 shows a schematic diagram of a deployment scenario of a relay-enhanced access network with radio-relayed extensions in a handover case.

FIG. 3 shows a schematic diagram of a deployment scenario of a relay-enhanced access network such as e.g. a Long Term Evolution (LTE) RAN with radio-relayed extensions in a handover case. The exemplary deployment scenario as shown in FIG. 3 is for illustrative purposes only, and builds the explanatory basis for the subsequent description of embodiments of the present invention.

As shown in FIG. 3, a user equipment UE is connected to its serving base station denoted as source donor base station (DeNB) via a relay node denoted as source relay node (RN). When a handover of the UE to another cell is performed, as indicated by the dashed arrow in FIG. 3, the user equipment will then be connected to its new serving base station denoted as target donor base station (DeNB) via a new relay node denoted as target relay node (RN). The individual connections being indicated by double-sided double-line arrows may be any kind of physical and/or logical connection, including for example X2 interface connections between relay nodes and base stations or between base stations.

A handover preparation procedure on the basis of such deployment scenario, as described below, is applicable to both relay architectures of first and second category described above. Accordingly, there is exemplarily assumed a case where the UE is handed over between two RNs that are connected to two different DeNBs, as this case is the most complex and other handover cases (for example, between two RNs within the same DeNB) may be derived from the description of this case.

According to embodiments of the present invention, a two-stage admission control approach is presented, as described hereinafter. In brief, in the two-stage approach according to embodiments of the present invention, admission control for handover, bearer setup and/or bearer modification is distributed between a relay node and a base station.

Figure 4:
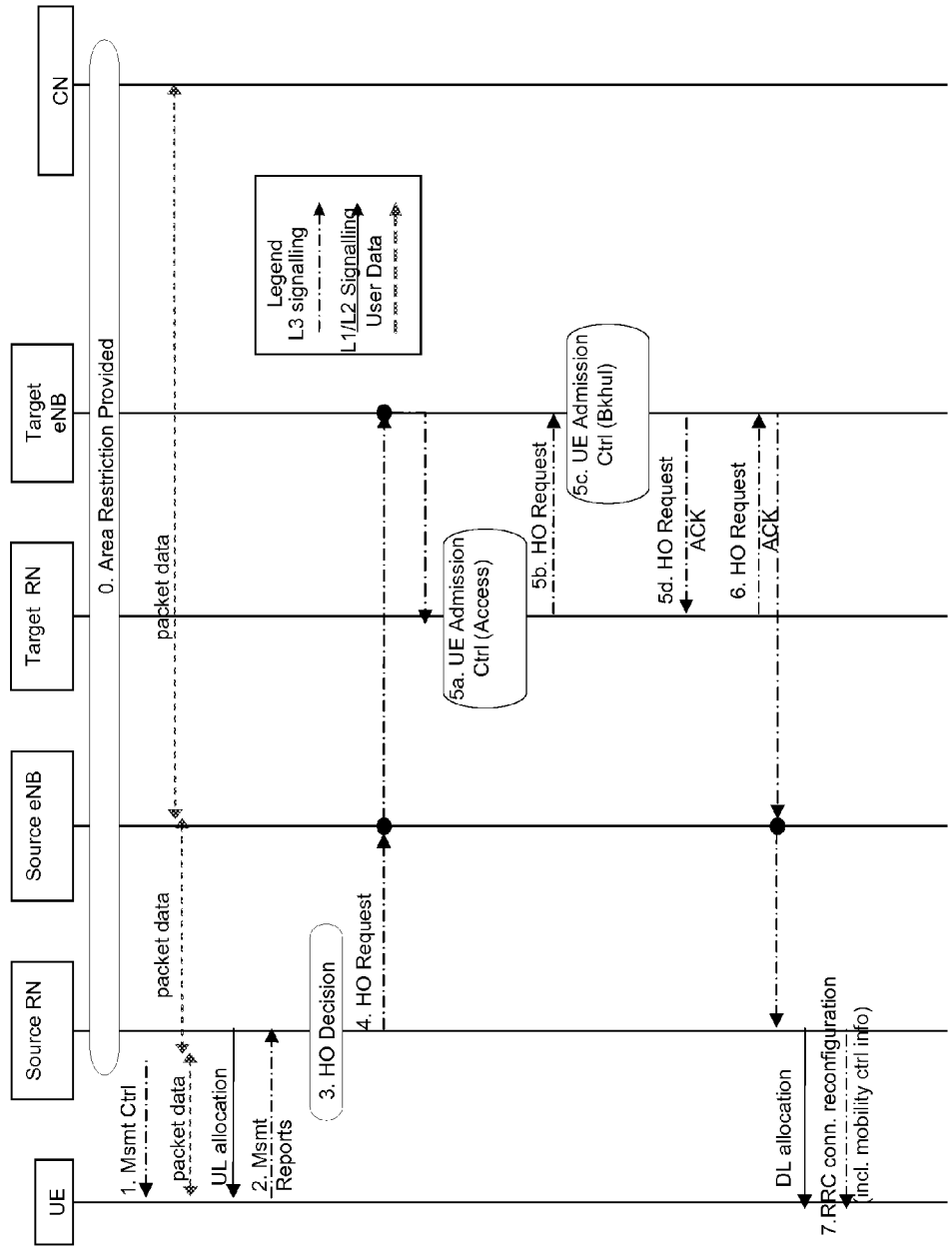
FIG. 4 shows a signaling diagram of a procedure of two-stage admission control for handover preparation in a relay architecture of first category according to exemplary embodiments of the present invention.

FIG. 4 shows a signaling diagram of a procedure of two-stage admission control for handover preparation in a relay architecture of first category according to exemplary embodiments of the present invention.

As shown in FIG. 4, based on measurement reports it is getting from the UE (see messages 1 and 2), the source RN decides to handover the UE to another RN (see step 3), and sends a handover request message (see message 4) towards the target eNB.

The handover request message received at the target eNB is forwarded towards the target RN transparently (i.e. target eNB is not aware of the contents of the message and forwards it to the target RN). Then, the target RN checks whether or not it can admit the UE so as to enable the requested handover based on the free access link resources available at the target RN, the QoS parameter of any active bearers of the UE as well as the QoS of the bearers of the already admitted UEs at the target RN. That is, the target RN executes admission control for the access link regarding the admission on bearers on the access link (see step 5a).

If the admission on or admission control for the access link succeeds, the target RN asks the target eNB for the required resources on the backhaul (see message 5b). This message is called HO request here, but could also be called e.g. backhaul admission request. Then, the target eNB checks whether or not it can admit the UE so as to enable the requested handover based on the availability of the required resources. That is, the target eNB executes admission control for the backhaul link regarding the admission on bearers on the backhaul link (see step 5c).

If the admission on or admission control for the backhaul link succeeds, the target eNB replies with a handover request acknowledgement (see message 5d). This message could also be called e.g. backhaul admission request acknowledge. Then, the target RN is sure that the UE can be admitted both on the access and backhaul links, and thus sends a handover request acknowledgement (see message 6) to the source RN via the target eNB. As a result of the successful admission, the source RN performs downlink resource allocation and radio resource control towards the UE to be handed over (see message 7). Thereby, the UE is told to start the handover towards the target RN.

It is noted that a successful admission of the UE (be it on the backhaul or access link or both) does not necessarily mean that all the bearers of the UE are admitted. Partial admission is also considered in this regard, where only a subset of the bearers of the UE is admitted due to resource limitations. Thus, a failed admission of a UE implies that none of the bearers of the UE could be admitted due to resource limitations. For details regarding the handling of a subset of bearers being admissible, reference is made to the enhanced two-stage admission control explained below.

Figure 5:
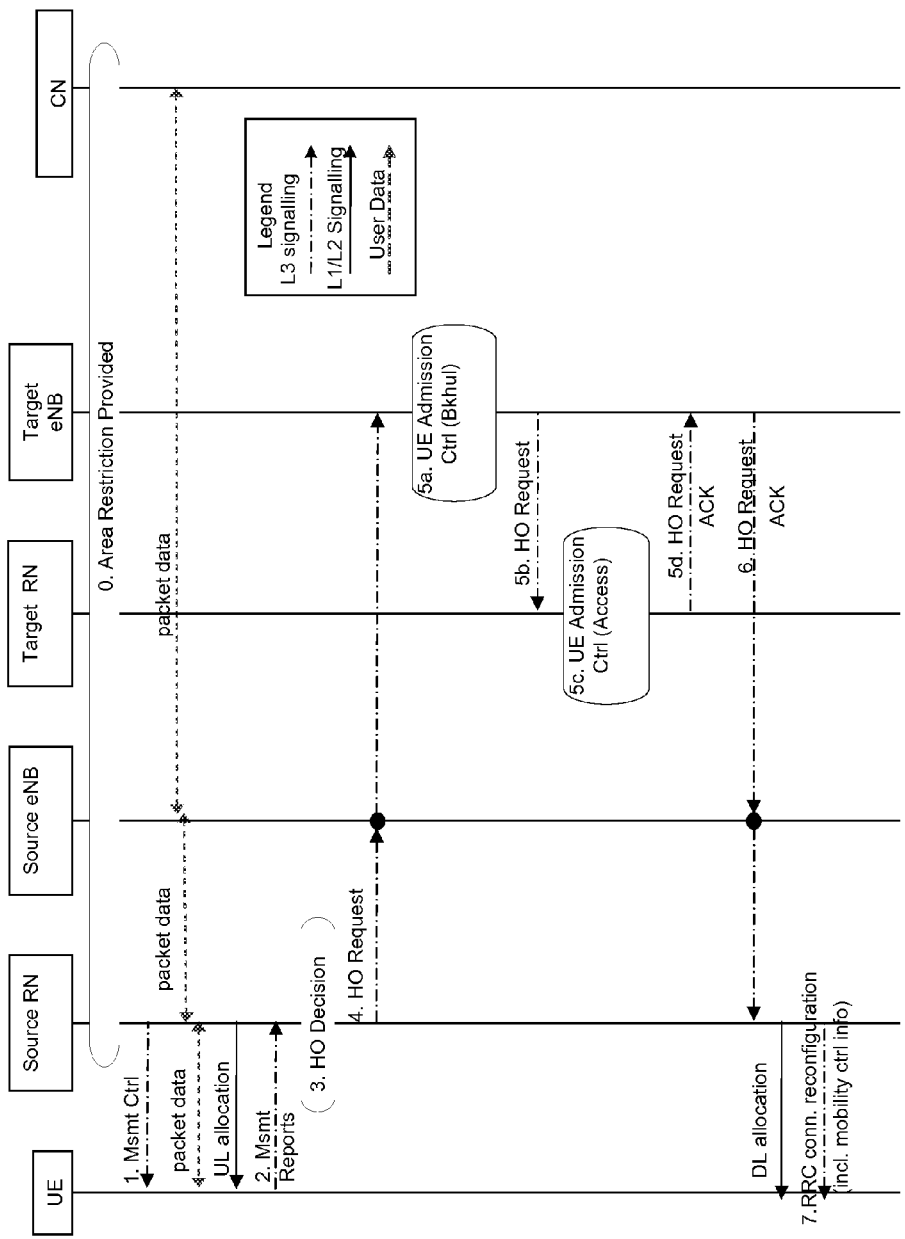
FIG. 5 shows a signaling diagram of a procedure of two-stage admission control for handover preparation in a relay architecture of second category according to exemplary embodiments of the present invention.

FIG. 5 shows a signaling diagram of a procedure of two-stage admission control for handover preparation in a relay architecture of second category according to exemplary embodiments of the present invention.

As shown in FIG. 5, similar to FIG. 4 above, based on measurement reports it is getting from the UE (see messages 1 and 2), the source RN decides to handover the UE to another RN (see step 3), and sends a handover request message (see message 4) towards the target RN.

The handover request message is received at the target eNB which is, in the relay architecture of the second category, aware of the handover request message, and checks whether or not it can admit the UE so as to enable the requested handover based on the availability of the required resources. That is, the target eNB executes admission control for the backhaul link regarding the admission on bearers on the backhaul link (see step 5a).

After successful admission on or admission control for the backhaul link, i.e. when the sufficiency of backhaul resources is guaranteed, the target eNB forwards the handover request message towards the target RN (see message 5b). This message could also be called e.g. access admission request. Then, the target RN checks whether or not it can admit the UE so as to enable the requested handover based on the free access link resources available at the target RN, the QoS parameter of any active bearers of the UE as well as the QoS of the bearers of the already admitted UEs at the target RN. That is, the target RN executes admission control for the access link regarding the admission on bearers on the access link (see step 5c).

If the admission on or admission control for the access link succeeds, the target RN replies with a handover request acknowledgement (see message 5d). This message could also be called e.g. access admission request acknowledge. Then, the target eNB is sure that the UE can be admitted both on the access and backhaul links, and thus sends a handover request acknowledgement (see message 6) to the source RN. As a result of the successful admission, similar to FIG. 4, the source RN performs downlink resource allocation and radio resource control towards the UE to be handed over (see message 7). Thereby, the UE is told to start the handover towards the target RN.

It is noted that in the case of resource limitations it is also possible that a resource reconfiguration in the backhaul link is executed during the backhaul admission control at the target eNB. That is, the target eNB may reconfigure the resource partitioning so that more subframes are allocated for the backhaul link or for the access link.

While the above specifically relates to handover preparation as an example for a requested bearer admission, another example relating to bearer setup (or modification) is detailed below.

Generally, in LTE release 8, each bearer is associated with a QoS Class Identifier (QCI) and Allocation and Retention Priority (ARP). The QCI class is defined by the priority, the packet delay budget and acceptable packet loss, and currently there are 9 QCI classes defined. The eNB uses the QCI values associated with a bearer to ensure that the traffic of the bearer meets the expected requirements. This can be done by using several mechanisms such as scheduling a bearer with high priority QCIs before those with lower priority, associating with the proper RLC (radio link control) mode depending on the packet delay budget and packet error rates of the bearer's QCI, or using several other mechanisms to shape and control the traffic rate.

The ARP is used during admission control and in case of resource limitations. In such cases, a bearer with a lower ARP can be dropped to accommodate a new bearer with a higher ARP. The ARP is typically not used for scheduling and other packet forwarding functionalities.

Apart from the QCI level, other QoS related parameters exist such as Guaranteed Bit Rate (GBR), Maximum Bit Rate (MBR), and Aggregate Maximum Bit Rate (AMBR), and may be used to control the scheduling and other packet treatments of the UE's bearers.

In the context of relaying, admission control of new (or modified) bearers and QoS maintenance of active bearers have to be performed considering the resources of both the air interface between the RN and UE (Uu or access link) and the backhaul interface between the RN and DeNB (Un or backhaul link).

Figure 6:
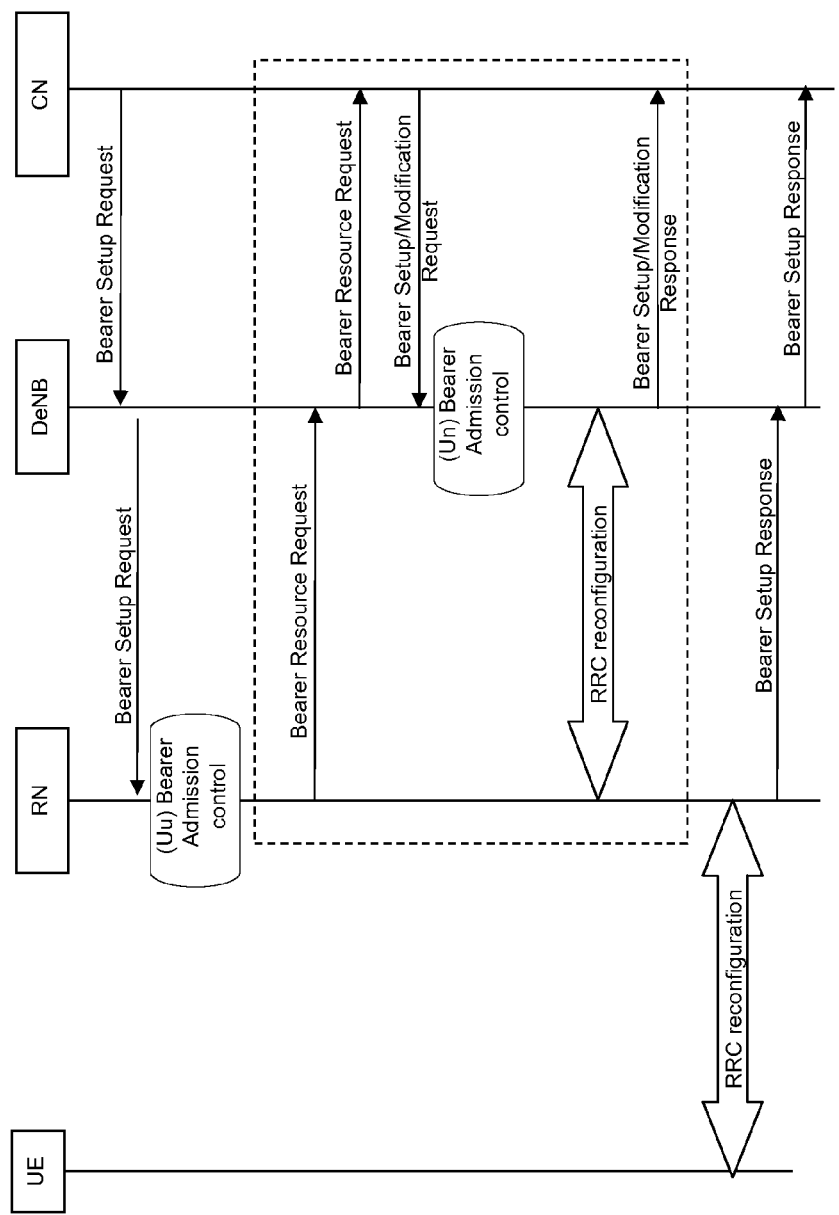
FIG. 6 shows a signaling diagram of a procedure of two-stage admission control for bearer setup in a relay architecture of first category according to exemplary embodiments of the present invention.

FIG. 6 shows a signaling diagram of a procedure of two-stage admission control for bearer setup in a relay architecture of first category according to exemplary embodiments of the present invention.

As shown in FIG. 6, when a new bearer is being set up, a bearer setup request, which contains the QoS requirements of the bearer, is sent by the Core Network (CN) towards a respective relay node RN. The QoS requirements of the bearer can be identified in several ways, e.g. by explicit specification by the UE when the service is being started or using Deep Packet Inspection (DPI), where higher layer parameters such as IP addresses and port numbers are used to determine the type of service and then map it to QoS requirements. As in the relay architecture of the first category the DeNB is not aware of the individual UE EPS bearers, this message is forwarded transparently to the RN.

The RN performs bearer admission control on the Uu or access link to check if there are enough radio (access link) resources to admit the requested bearer. This is under the assumption that there might be an over provisioning on the backhaul link which can lead to not all of the backhaul resources being allocated to a given RN being fully used. That is, the RN may check if there are any unused backhaul resources out of the total backhaul resources that are allocated to it.

If there is an already established Un bearer (on the backhaul link) to which the Uu bearer (on the access link) can be mapped to and enough resources are available on the Un or backhaul link, then the messages inside the dotted box may be omitted. If so, the RN sets up the bearer with the UE using RRC reconfiguration messages, and after that the success of the bearer setup is communicated to the CN with a bearer setup response message which is forwarded transparently to the CN.

Otherwise, if there are resource limitations on the Un or backhaul link, the RN communicates the required resources to the DeNB with a bearer resource request message, and the DeNB then forwards this request to the CN. If the RN is allowed to have the requested resources, a Un bearer setup/modification procedure is performed to re-dimension the Un resources (in the same way as a release 8 UE bearer modification, as the RN is just like a UE from the DeNB point of view). To this end, a bearer setup/modification request is communicated from the CN to the DeNB, which then performs bearer admission control on the Un or backhaul link to check if there are enough backhaul link resources to admit the requested bearer. If so, the DeNB sets up the bearer with the RN using RRC reconfiguration messages, and after that the success of the bearer setup is communicated to the CN with a bearer setup/modification response message. After that the RRC reconfiguration can be made as in the non-resource limited case (i.e. the procedure omitting the processes depicted within the dotted box), and the bearer setup is finalized.

Figure 7:
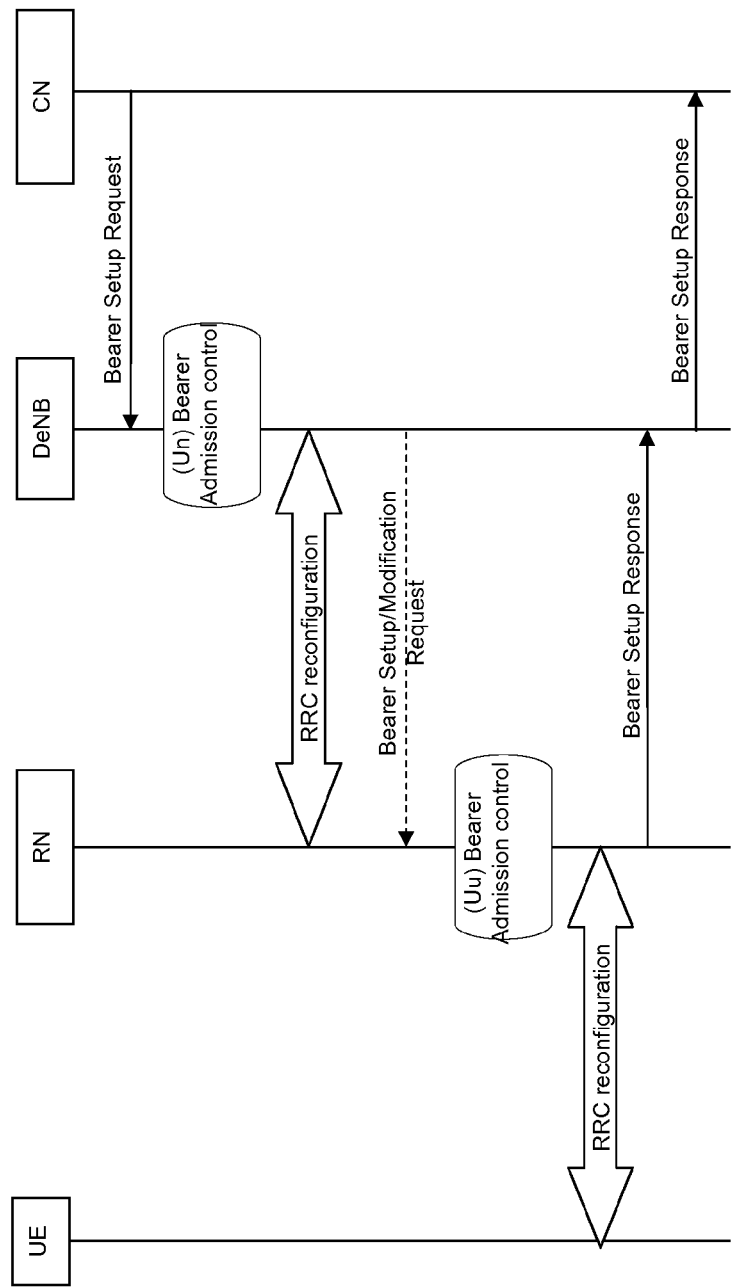
FIG. 7 shows a signaling diagram of a procedure of two-stage admission control for bearer setup in a relay architecture of second category according to exemplary embodiments of the present invention.

FIG. 7 shows a signaling diagram of a procedure of two-stage admission control for bearer setup in a relay architecture of second category according to exemplary embodiments of the present invention.

As shown in FIG. 7, when a new bearer is being set up, a bearer setup request, which contains the QoS requirements of the bearer, is sent by the Core Network (CN) towards a respective base station DeNB. As in the relay architecture of the second category the DeNB is aware of the individual UE EPS bearers, the DeNB then performs bearer admission on the Un or backhaul link. In case of a successful Un bearer admission result, the DeNB sets up a new corresponding Un bearer (on the backhaul link) with the same QoS parameters as the UE EPS bearer (in the case of one-to-one mapping, using the bearer setup request) or maps it to an already existing Un bearer (in case of many-to-one mapping, which might require bearer modification request).

Upon getting a bearer setup/modification request from the DeNB, the RN performs bearer admission control on the Uu or access link. In case of a successful Un bearer admission result, the RN sets up the required Uu bearer (on the access link) using the RRC reconfiguration procedure, and responds with a bearer setup response to the DeNB. The DeNB finalizes the bearer setup by sending a bearer setup response to the CN.

Since the DeNB is aware of the individual UE EPS bearers in the relay architecture of the second category, and they might even be mapped one-to-one to the Un bearers, in the case of resource limitations, it can directly employ the ARP to drop lower priority bearers on behalf of a higher priority new bearer. In the relay architecture of the first category, due to the fact that the DeNB is not aware of the individual UE EPS bearers and also only many-to-one mapping of several UE EPS bearers to Un bearers is possible, the admission control is slow compared to the relay architecture of the second category. The consequence of this is that when admitting a high priority UE EPS bearer (for example, for emergency services), a slower bearer setup occurs in the relay architecture of the first category architecture because a Un bearer setup modification has to be made that will have to involve the CN. As such, an enhancement of the operations of the relay architecture of the first category architectures would be required, if the QoS of high ARP UE EPS bearers is to be guaranteed.

The above exemplified procedures provide for mechanisms for admission control in relay-enhanced access networks.

Figure 1:
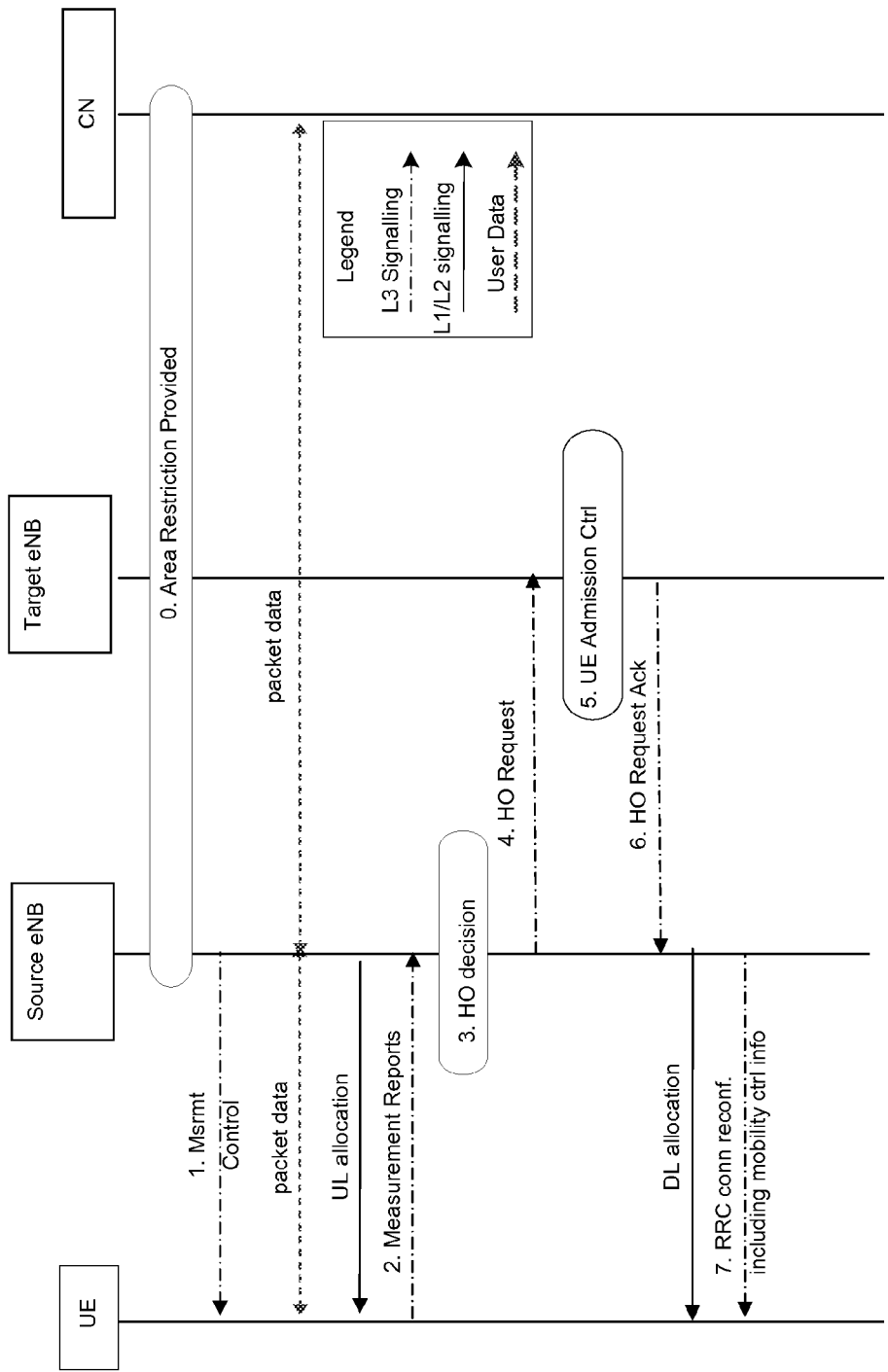
FIG. 1 shows a signaling diagram of an admission control procedure for handover preparation in accordance with LTE and LTE-Advanced.
Figure 2:
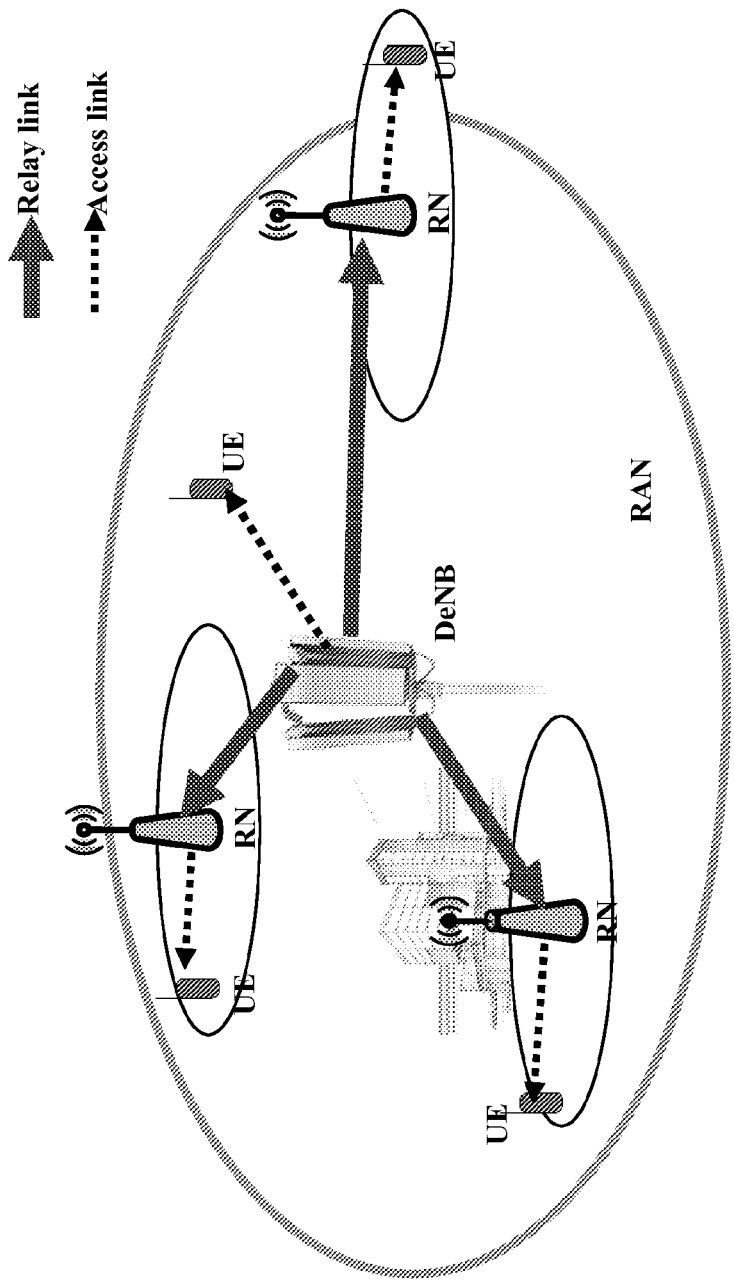
FIG. 2 shows a schematic diagram of a typical deployment scenario of a relay-enhanced access network.

These mechanisms may, however, still suffer from non-optimal delay and signaling overhead. Namely, comparing the above handover procedures for the relay architecture of the first and second categories with that of LTE release 8, as shown in FIG. 1, additional delays may be incurred when relays are involved. Also, if one of the admission control procedures for the access link and the backhaul link fails, then the whole admission control, e.g. the whole handover, is rejected, and thus more time is spent before a handover to another RN or DeNB, which is next in the handover candidate list, can be tried. There may even be extra delay because the different message sequences will not necessarily be performed sequentially in a time-wise manner without interruptions due to the usage of an MBSFN (multicast broadcast single frequency network) subframe for the communication between the RN and DeNB. For example, if 1/10-th of the subframes are allocated for the backhaul link, just the extra handover request and handover request acknowledgment messages between the target RN and DeNB can cost at least 10 ms and up to 20 ms of extra delay.

In view thereof, according to embodiments of the present invention, the above exemplified procedures provide for mechanisms for admission control in relay-enhanced access networks may be enhanced as follows.

In such enhanced two-stage admission control according to embodiments of the present invention, the basic procedures are similar to those described above. The main difference is that a distinction is made whether all of requested bearers may be admitted, and in case of only some of the requested bearers could be admitted, the admission control is not terminated or rejected entirely, but is continued for those bearers. To this end, corresponding information on a subset of bearers that could be admitted is exchanged between respective RN and (D)enB, in case of handover preparation between target RN and target eNB.

For the relay architecture of the second category, referring to FIG. 5, the base station (target eNB or DeNB) receiving e.g. the handover request (i.e. a bearer admission request for one or more than one bearer), checks whether all of the requested bearers to be handed over can be admitted on the backhaul link in view of available backhaul link resources. If so, the procedure proceeds as describe above. If not, the base station does not reject the whole handover process, but identifies the subset of bearers that can be admitted on the backhaul link (with the required QoS being satisfied), and forwards a modified handover request that contains only the list of backhaul-admitted bearers to the relay node, (i.e. the ones which cannot be admitted in the backhaul are removed from the original list of bearers to be admitted received in the original handover request at the base station).

When the base station receives a handover request acknowledgment from the relay node, it gets additional information which contains the bearers (from those that are already admitted on the backhaul link) that were also capable of being admitted on the access link. This is the final set of bearers to be admitted in the system, and the base station constructs a complete list that contains the bearers that can be admitted and those that can not be admitted. This new list may then be forwarded inside the handover request acknowledgment message towards the source RN and later on to the UE via the RRC reconfiguration message.

The (target) RN may initiate a bearer modification request to RN bearers in parallel with bearer admission request acknowledgment procedures between e.g. target RN and source RN, which will hide the latency introduced by the RN bearer modification request because it can be done before the handover actually takes place.

While the above relates to the relay architecture of the second category, similar procedures are also applicable for the relay architecture of the first category, referring to FIG. 4 above. In this case, the relay node may, when receiving the handover request, check whether all of the requested bearers can be admitted on the access link in view of available access link resources. If so, the procedure continues as described above. If not, the relay node does not reject the whole handover process, but may identify the subset of bearers that can be admitted on the access link (with the required QoS being satisfied), and forward the modified handover request to the proper base station in a correspondingly modified manner.

The two-stage approach according to embodiments of the present invention enjoys benefits including limited impact to standard and product development, as well as ease of implementation.

Besides, the two-stage approach according to embodiments of the present invention is more efficient in terms of delay and overhead aspects.

In implementation, e.g. in the cases of FIGS. 5 and 7 relating to the relay architecture of the second category, after admission control at the base station, a certain amount of Un radio resources should be reserved by the base station in accordance with the admitted bearers. These resources might be released, if later-on the RN reports the failure of admission control one the Uu link. Further, if the UE possibly fails to respond to e.g. the RRC message RRCConnectionReconfiguration, and the RN does not receive e.g. the RRC message RRCConnectionReconfigurationComplete, it is not able to send e.g. the message BearerSetupResponse to the base station. Therefore, according to embodiments of the present invention, a timer may be introduced at the RN, which is started by receiving the message BearerSetupRequest, and stopped by receiving RRCConnectionReconfiguration-Complete. The duration of the timer may be configured statically or dynamically according to the Un load status. Upon its expiry, the RN may send e.g. the message BearerSetupResponse to the base station, indicating the failure of Uu admission control. This can solve problems of Un resource being reserved too long unnecessarily.

In the context of bearer admission requests for a plurality of bearers, for example in the context of a handover request of a UE having multiple bearers, it is to be noted that bearer admission control for the bearers requested for admission may be executed either in a successive manner for one bearer at a time (i.e. bearer by bearer) or in a joint manner for more than one or all of the bearers at a time (i.e. for a (sub-)set of the bearers together). Also, in this context, it is to be noted that admission control for the multiple bearers may include a prioritization of the bearers requested for admission (e.g. according to ARP) and an execution of the bearer admission control in the order of prioritization of the bearers (as explained in detail below in connection with the one-stage approach). Such prioritization may be made separately or commonly for the bearer admission on the access link and the backhaul link, and may be effected at the respective network entity (i.e. the base station for the backhaul link and/or the relay node for the access link).

According to embodiments of the present invention, a method for an enhanced one-stage admission control may, in line with the above description, comprise, upon receiving a bearer admission request (e.g. a handover request containing a list of several bearers) of bearers in a relay-enhanced access network, said bearers consisting of a bearer on an access link between a user equipment and a relay node and a bearer on a backhaul link between said relay node and a base station, a checking whether sufficient local resources are available and/or are to be made available for admitting said bearers on the one of said access link and said backhaul link which is local at an apparatus executing the method. Then, when only a subset of bearers is identified as being able to be admitted, the method may further comprise executing a bearer admission control of said identified subset of bearers on the local link, and informing another apparatus being responsible for admission control on the other one of said access link and said backhaul link ("remote link") about the subset of bearers having been admitted on the local link.

According to embodiments of the present invention, an apparatus is configured to perform such a method, and may comprise a corresponding receiver, a corresponding bearer admission control processor being configured to perform the checking and admission control procedures, and a corresponding transmitter. The structure of such apparatus is basically similar to that outlined in connection with FIG. 13 below, with structural and functional differences being evident in view of the differences in terms of methods and procedures which are evident from the subsequent description of a one-stage approach as compared with the present two-stage approach.

In case of the relay architecture of the first category, the apparatus executing such method is a relay node, the other apparatus is a base station, the local link is the access link, and the remote link is the backhaul link. In case of the relay architecture of the second category, the apparatus executing such method is a base station, the other apparatus is a relay node, the local link is the backhaul link, and the remote link is the access link.

According to embodiments of the present invention, a one-stage admission control approach is presented, as described hereinafter. In brief, in the one-stage approach according to embodiments of the present invention, admission control for handover, bearer setup and/or bearer modification is concentrated at a relay node or a base station depending on the underlying relay architecture.

In a one-stage admission control according to embodiments of the present invention, the admission control for one or more bearers (which is/are to be handed over, set up and/or modified) is performed at a single network entity. In a relay architecture of the first category, a combined admission control for the backhaul and access links is performed solely at a relay node. In a relay architecture of second category, a combined admission control for the backhaul and access links is performed solely at a base station.

By way of such enhanced admission control in relay-enhanced access networks, the delay and the signaling overhead may be reduced as a requested bearer is admitted without involving two separate admission control procedures at two separate network entities.

It is to be noted that the subsequent description of exemplary embodiments of the present invention is based on the exemplary and non-limiting assumption that, in combined bearer admission control, admission control on the access link is executed prior to admission control on the backhaul link. Yet, this assumption is only for illustrative purposes, and the bearer admission control on the access link and the bearer admission control on said backhaul link may be equally executed in an arbitrary order. The order of execution of bearer admission control on the access link and the backhaul link may even be different for individual ones of multiple bearers requested for admission.

Further, it is noted that the subsequent description of exemplary embodiments of the present invention mostly refers to bearer admission for a single bearer requested for admission. Yet, this is only for illustrative purposes, and in no way limiting. Rather, bearer admission may also be executed for a plurality of bearers, for example in the context of a handover request of a UE having multiple bearers.

Figure 8:
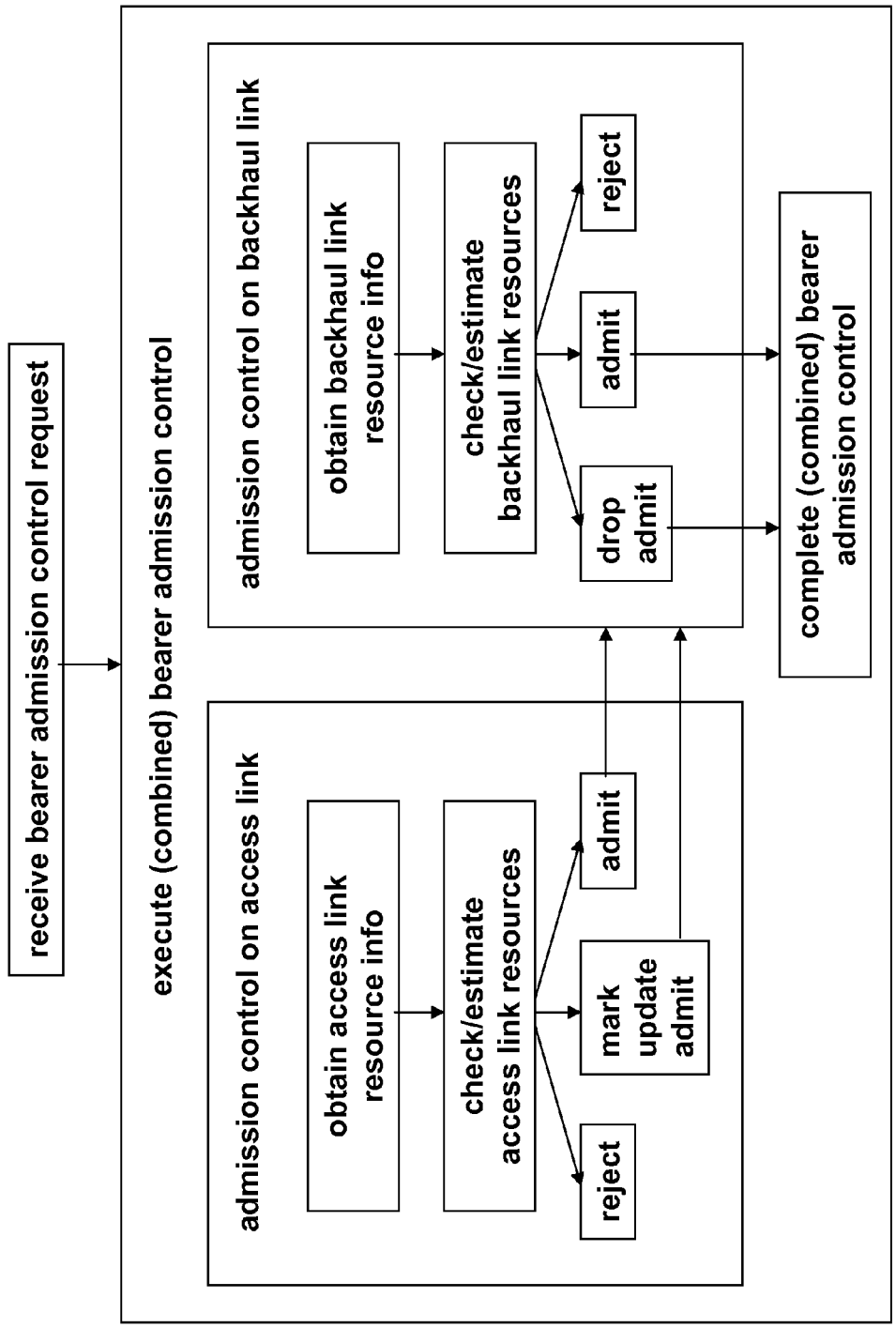
FIG. 8 shows a schematic block diagram of a procedure of one-stage admission control according to exemplary embodiments of the present invention.

FIG. 8 shows a schematic block diagram of a procedure of one-stage admission control according to exemplary embodiments of the present invention.

Depending on the underlying relay architecture, such procedure may be executed at different network entities. In case of the relay architecture of the first category, such procedure is executed by a relay node for which the access link may be regarded as a local link (for which resource information may be locally obtained e.g. by measurements) and the backhaul link may be regarded as a remote link (for which resource information are to be provided by a remote network entity such as the base station). In case of the relay architecture of the second category, such procedure is executed by a base station for which the backhaul link may be regarded as a local link (for which resource information may be locally obtained e.g. by measurements) and the access link may be regarded as a remote link (for which resource information are to be provided by a remote network entity such as the relay node).

As shown in FIG. 8, a method according to embodiments of the present invention, basically comprises an operation of receiving a bearer admission request of at least one bearer (e.g. in the form of a handover request or a bearer setup/modification request), and an operation of executing a combined bearer admission control of said at least one bearer at one of said relay node and said base station, including a bearer admission control on the access link and a bearer admission control on the backhaul link. The receiving operation may be accomplished by a correspondingly configured receiver, and the admission operation may be accomplished by a correspondingly configured bearer admission control processor.

In the operation of combined bearer admission control, a bearer admission control is performed on the access link and on the backhaul link. In the illustrated examples, the bearer admission control on the access link is performed first, and a bearer admission control on the backhaul link is performed thereafter in case bearer admission on the access link has been successful for at least one bearer (in case more than one bearer is requested at a time). However, the order can also be reversed, i.e. first the bearer admission control on the backhaul link is performed and afterwards on the access link, or both admission control steps can be done in parallel.

In the bearer admission control on the access link, information on available resources on the access link are obtained, and it is checked whether sufficient access link resources are available and/or are to be made available for admitting the requested bearer on the access link, e.g. by dropping one or more existing bearers on the access link having a lower priority than the bearer requested for admission. The obtaining of access link resource information may include measuring and/or retrieving from a local storage the required information in case of the relay architecture of the first category, and may include receiving and/or, if having been received and stored earlier, retrieving from a local storage the required information from a relay node in case of the relay architecture of the second category. The checking of the sufficiency of access link resource may include estimating total access link resources which may be made available. When sufficient access link resources are not available, but may be made available, those one or more bearers to be dropped for making available enough resources are marked, the bearer is admitted on the access link, and resources on the backhaul link are updated, which are to be freed by said dropping. Further, when sufficient access link resources are available and/or may be made available, the bearer is admitted on the access link. Still further, when sufficient access link resources are not available and may not be made available, admission of the requested bearer is rejected.

In case of a successful outcome of the bearer admission control on the access link, the method proceeds to the bearer admission control on the backhaul link for those bearers having already been admitted on the access link.

In the bearer admission control on the backhaul link, information on available resources on the backhaul link are obtained, and it is checked whether sufficient backhaul link resources are available and/or are to be made available for admitting the requested bearer on the backhaul link, e.g. reconfiguring backhaul resources after completion of the bearer admission on the backhaul link and/or by dropping one or more marked bearers on the access link having a lower priority than said bearer requested for admission. The obtaining of backhaul link resource information may include measuring and/or retrieving from a local storage the required information in case of the relay architecture of the second category, and may include receiving and/or, if having been received and stored earlier, retrieving from a local storage the required information from a base station in case of the relay architecture of the first category. The checking of the sufficiency of backhaul link resource may include estimating total backhaul link resources which may be made available. When sufficient backhaul link resources are not available and may not be made available by said reconfiguring, but may be made available by said dropping, said one or more marked bearers on the access link are dropped and corresponding one or more bearers on the backhaul link are dropped, and the bearer is admitted on the backhaul link. Further, when sufficient backhaul link resources are available and/or may be made available by said reconfiguring, the bearer is admitted on the backhaul link. Still further, when sufficient backhaul link resources are not available and may not be made available, admission of the requested bearer is rejected.

In case of a successful outcome of the bearer admission control on the backhaul link, the method proceeds to completing the combined bearer admission control.

Although not shown in FIG. 8, a method according to embodiments of the present invention may also comprise sending an update message including a result of bearer admission control for the access link and/or the backhaul link to the network entity from which remote link information have been received, and/or reconfiguring backhaul resources at the base station after completion of said bearer admission on the backhaul link. Such sending may be accomplished by a correspondingly configured transmitter, and such reconfiguring may be accomplished by a correspondingly configured reconfiguration processor.

Referring to FIG. 8, it is noted that, in a procedure of one-stage admission control according to exemplary embodiments of the present invention, which has a reverse order of access and backhaul link admission control, the terms "access" and "backhaul" are essentially to be exchanged in this illustration and its description.

Details of the individual operations become evident from the examples described hereinafter with reference to FIGS. 9 to 12.

In the following, the admission control of a single new bearer is exemplarily described for both categories of relay architectures mentioned above. It is noted that the procedures of admission control described below are applicable to any kind of bearer admission including handover (preparation) as well as bearer setup and/or modification procedures.

Figure 9:
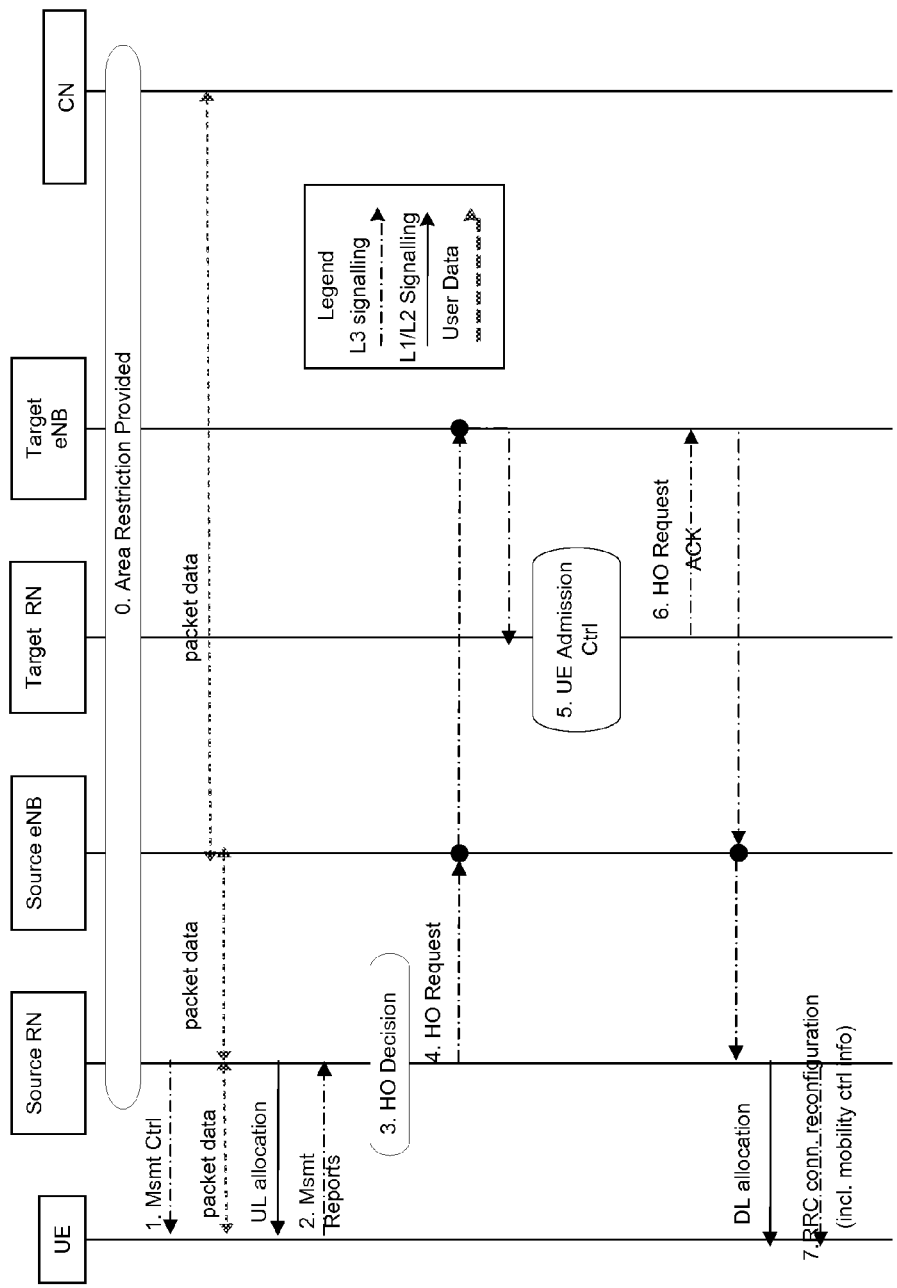
FIG. 9 shows a signaling diagram of a procedure of one-stage admission control for handover preparation in a relay architecture of first category according to exemplary embodiments of the present invention.

FIG. 9 shows a signaling diagram of a procedure of one-stage admission control for handover preparation in a relay architecture of first category according to exemplary embodiments of the present invention.

As shown in FIG. 9, based on measurement reports it is getting from the UE (see messages 1 and 2), the source RN decides to handover the UE to another RN (see step 3), and sends a handover request message (see message 4) towards the target eNB.

The handover request message received at the target eNB is forwarded towards the target RN transparently (i.e. target eNB is not aware of the contents of the message and forwards it to the target RN). Then, the target RN checks whether or not it can admit the UE on the access link as well as on the backhaul link so as to enable the requested handover. That is, the target RN executes combined admission control for the access and backhaul links regarding the admission on bearers on the access and backhaul links (see step 5).

If the admission control succeeds, the target RN replies with a handover request acknowledgement to the target eNB (see message 6). This message could also be called e.g. combined admission request acknowledge. Then, the target eNB is sure that the UE can be admitted both on the access and backhaul links, and thus sends a handover request acknowledgement to the source RN. It may also just forward the message transparently back towards the source RN. As a result of the successful admission, the source RN performs downlink resource allocation and radio resource control towards the UE to be handed over (see message 7). Thereby, the UE is told to start the handover towards the target RN.

Figure 10:
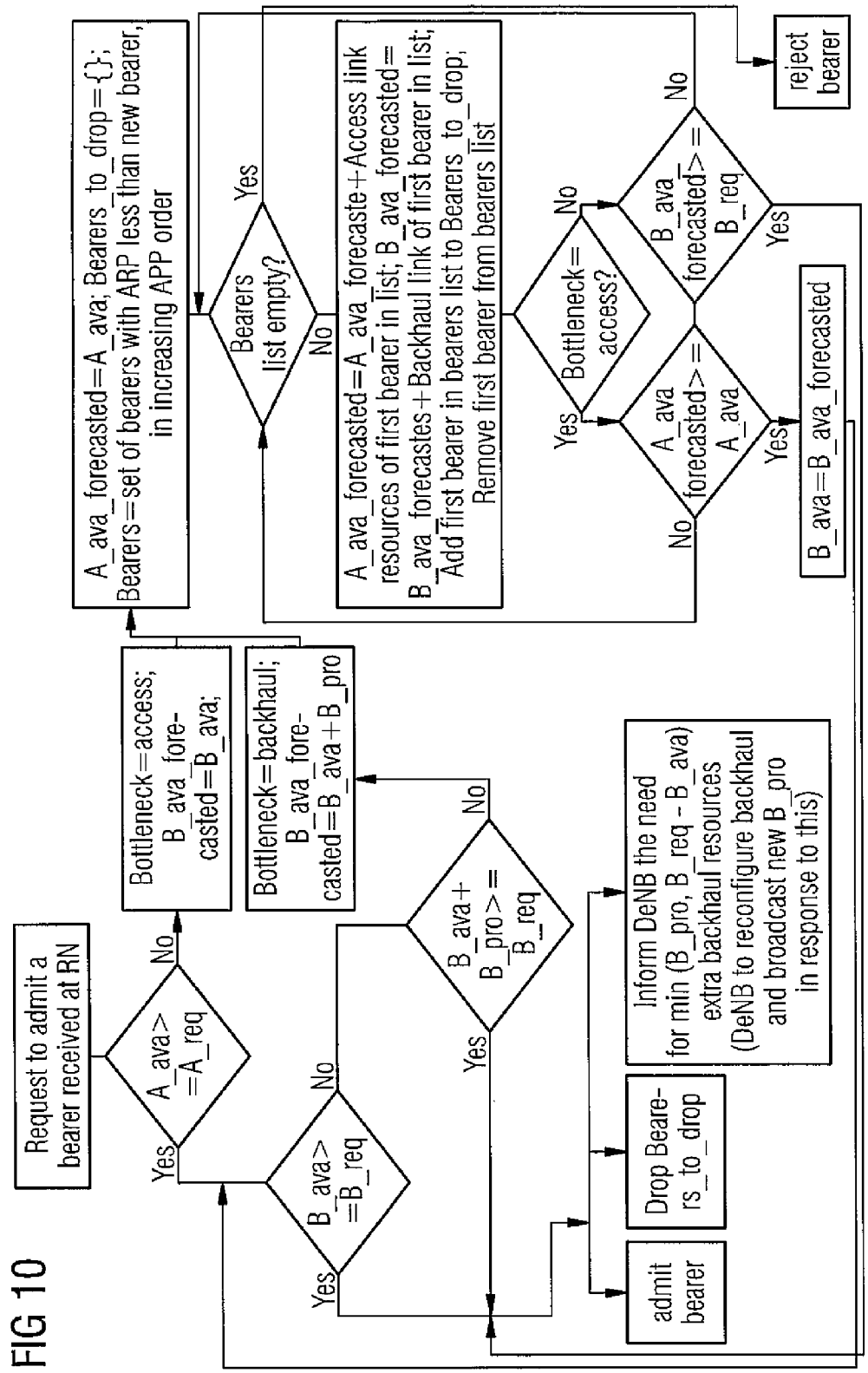
FIG. 10 shows a schematic flow chart of one-stage admission control in a relay architecture of first category according to exemplary embodiments of the present invention.

The combined bearer admission control of step 5 in FIG. 9 is explained below, while specific operations thereof are also depicted in FIG. 10. FIG. 10 shows a schematic flow chart of one-stage admission control in a relay architecture of first category according to exemplary embodiments of the present invention.

In this regard, the following terms are used:
A_req: required access link resources to admit the requested bearer
A_ava: free access link resources of the relay node
B_req: required backhaul link resources to admit the requested bearer
B_ava: free backhaul link resources for the relay node
B_pro: more Backhaul resources that the base station can make available to a requesting relay node; it accounts e.g. free resources that may be available at the end of on ongoing resource partitioning reconfiguration, free resources due to UE handover to another eNB/RN already accepted but not yet performed (resources are not yet free at the source), etc.

For the RN to be able to perform the admission control both on the backhaul and access links, it requires up-to-date information about the resource utilization on the backhaul link. This can be realized with periodic or event triggered update procedures where, for example, the target eNB informs all its subordinate RNs about the resource usage in the backhaul. The eNB may communicate to the RN e.g. B_ava and B_pro or the sum B_ava+B_pro. That is, each individual RN will be aware of the "actual" as well as the "possible" available backhaul resources.

Stated in other terms, detailed (or summarized) information about the Un or backhaul bearers is sent from the target eNB to the RN so that the RN has the information needed to map Un or backhaul bearers with Uu or access bearers. This may also be used, for example, to estimate the amount of additional backhaul resources that become available when low ARP access link bearers are dropped for the sake of admitting higher ARP access link bearers, as will be described later.

When a request to admit a bearer is received at the RN, the RN first checks to see if there are enough available resources in its access link. If not, the RN will check if there are bearers with ARPs lower than that of the requested bearer that can be dropped to accommodate the requested bearer. If so, the bearers to be dropped are marked, and the available backhaul capacity is also updated to reflect the backhaul resources to be freed once these bearers are dropped. However, if dropping lower ARP bearers is still not sufficient to guarantee the access link resources needed to admit the requested bearer, the bearer will be rejected immediately.

After a successful access link admission, the RN continues the admission control for the backhaul link. This is done by checking if the free backhaul resources (for example, the updated B_ava in case the access link admission required the dropping of low ARP bearers) are enough to accommodate the requested bearer. If so, the bearer can be admitted immediately. If the free backhaul resources are not sufficient, the RN checks if the additional required backhaul resources can be fulfilled by the promised backhaul resources from the target eNB. If so, the RN can admit the bearer immediately.

If the promised backhaul resources are not sufficient, the RN can decide to drop other Uu bearers on the access link (with lower ARP) and, consequently, to modify/drop Un bearers on the backhaul link in order to free further resource on the backhaul link. If the admission decision is positive, the RN may send an update message in parallel to the target eNB regarding the results of the admission control for the backhaul link (namely, how much extra backhaul resources it needs and the modified/dropped Un bearers). The backhaul resources for the RN can then be reconfigured by the target eNB, and the new value of the promised backhaul resources can be broadcasted to all the subordinate RNs by the target eNB. This is necessary to avoid that a RN admits a bearer using promised backhaul resources which were, however, already taken by another RN.

The RN may also inform the target eNB about the result of bearer admission. Such result may reflect not only when a bearer is accepted but also when the bearer is rejected (and if it is due to limitations on the access link or the backhaul link) because this information can be used by the target eNB to optimize the resource partitioning later on.

For the relay architecture of the first category, the base station is specifically configured to accomplish up-to-date distribution of information on the backhaul resources towards its subordinate relay nodes, and the relay nodes are specifically configured to understand this backhaul information, and to inform the controlling (donor) base station when they need extra backhaul resources.

The exchange of corresponding information on backhaul/access link resource usage and "promised resources" may be accomplished by a modified radio resource control including a corresponding information element to be used to this end.

Figure 11:
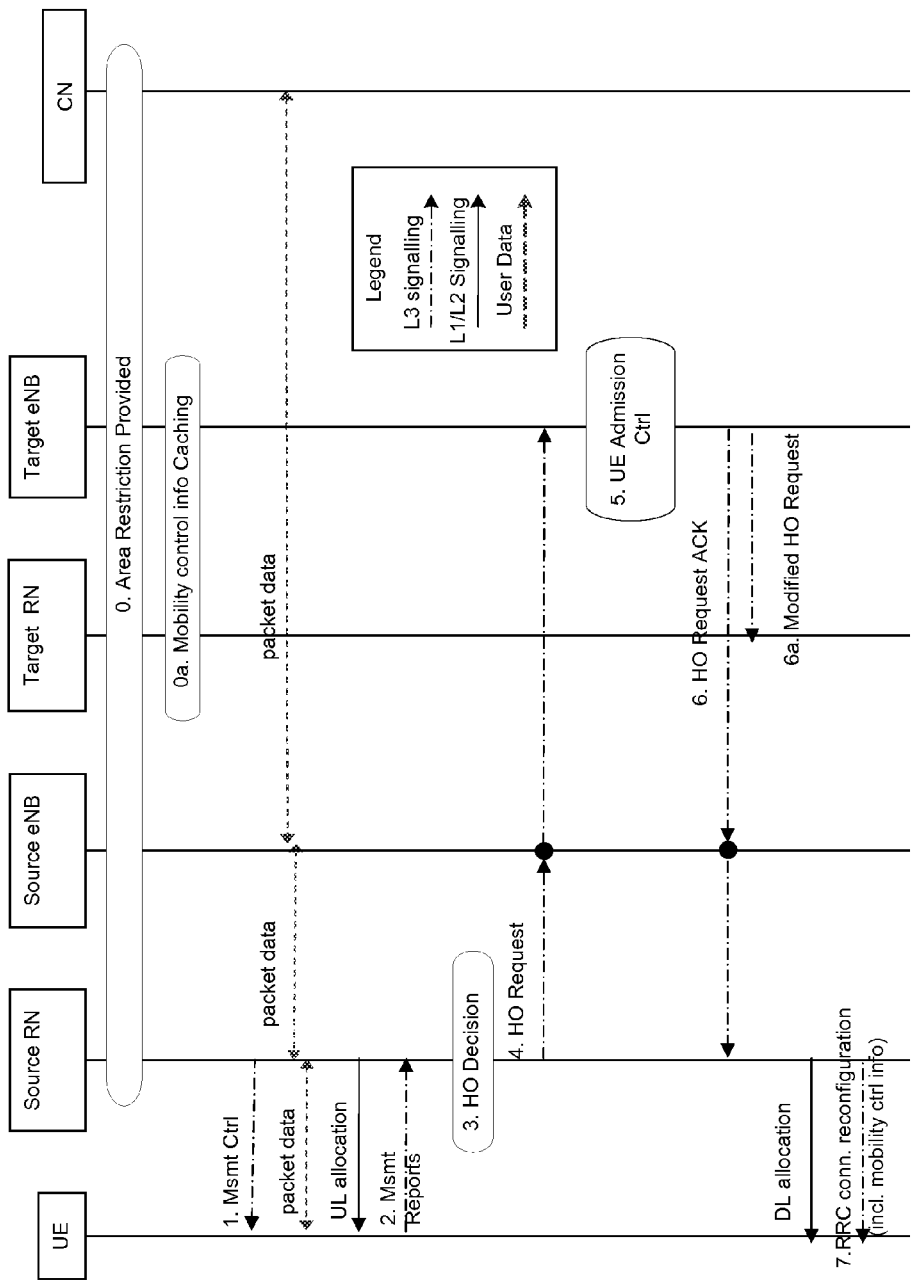
FIG. 11 shows a signaling diagram of a procedure of one-stage admission control for handover preparation in a relay architecture of second category according to exemplary embodiments of the present invention.

FIG. 11 shows a signaling diagram of a procedure of one-stage admission control for handover preparation in a relay architecture of second category according to exemplary embodiments of the present invention.

As shown in FIG. 11, based on measurement reports it is getting from the UE (see messages 1 and 2), the source RN decides to handover the UE to another RN (see step 3), and sends a handover request message (see message 4) towards the target eNB.

The handover request message is received at the target eNB which is, in the relay architecture of the second category, aware of the handover request message and checks whether or not it can admit the UE on the access link as well as on the backhaul link so as to enable the requested handover. That is, the target eNB executes combined admission control for the access and backhaul links regarding the admission on bearers on the access and backhaul links (see step 5).

If the admission control succeeds, the target eNB is sure that the UE can be admitted both on the access and backhaul links, and the target eNB replies with a handover request acknowledgement to the source RN (see message 6). As a result of the successful admission, the source RN performs downlink resource allocation and radio resource control towards the UE to be handed over (see message 7). Thereby, the UE is told to start the handover towards the target RN.

In the present exemplary scenario, since combined bearer admission control is executed at the target eNB, while the target RN does not actively participate in the actual handover process and associated bearer admission, the target RN needs to be involved so as to inform it about the UE being handed over to it and the corresponding bearer or bearers of this UE. To this end, according to embodiments of the present invention, mobility control information from the target RN may be cached at the target eNB and/or information regarding the result of handover/bearer admission may be sent from the target eNB to the target RN. In the exemplary illustration of FIG. 11, this is indicated by steps 0a and 6a.

In step 0a, relevant parameters for mobility control are transferred from the target RN to the target eNB, which are cached at the target eNB. This enables that the target eNB may send a complete handover acknowledgment (i.e. containing all relevant information relating to mobility) towards the UE upon completion of bearer admission. Such caching may take place at any point prior to or in the handover process, and not only at the point exemplarily illustrated in FIG. 11.

In step 6a, information regarding the result of handover/bearer admission is sent from the target eNB to the target RN, i.e. information stating that the UE has been admitted. Such information may take place at any point after bearer admission in step 5, i.e. prior to, in parallel with or after the messaging of the handover request acknowledgment. The respective message could for example be called e.g. modified handover (HO) request.

Such modified HO request according to embodiments of the present invention may be a message similar to the HO request, and may for example be based on a specified HO request message structure, but with more information like "The HO request for the UE has been received from and admitted". It may also include additional information like which elements of the (cached) mobility information from the target RN have been used for bearer admission and construction of mobility information. Such additional information could be beneficial in case no predefined order of C-RNTIs (cell radio network temporary identifiers) is agreed between the target RN and the target eNB.

Further, such modified HO request according to embodiments of the present invention may comprise an additional flag. If this flag is set, then the target RN can interpret this as an indication from the target DeNB that the UE has been admitted and the target RN should anticipate communication from it. On the other hand, if this flag is not set, then the target RN can interpret this, for example, as a request for more detailed resource availability information or a request for an ad-hoc report whether the target RN has required resources for bearer admission. This would be specifically effective in case of a usage of a resource range as resource availability information, as explained in detail below.

For the purpose of such modified HO request according to embodiments of the present invention, a HO request message structure according to LTE release 8 (in particular, section 9.1.1.1 and 9.2.13 of specification TS 36.423 relating to X2) may be used as follows. The thus specified HO request message structure is such that the HO request includes an information element called "Message Type" which may have the following values of procedure code being an integer between 0 and 255.

"0"=Handover Preparation
"1"=Handover Cancel
"2"=Load Indication
"3"=Error Indication
"4"=SN Status Transfer
"5"=UE Context Release
"6"=X2 Setup
"7"=Reset
"8"=eNB Configuration Update
"9"=Resource Status Reporting Initiation
"10"=Resource Status Reporting
"11"=Private Message The type of message is an initiating message, a successful outcome, an unsuccessful Outcome, or the like.

According to embodiments of the present invention, this HO request message structure may be used such that for a normal HO request, procedure code=0 and type of message="initiating message" is used (which may, in certain embodiments, also indicate that the target DeNB has decided to fall back to the aforementioned two-stage admission control process and, thus, the target RN has to admit the bearers included in the HO request in its access link as in the two-stage admission control process and report via HO request ACK towards the target DeNB on successful admission), for a HO request that tells the target RN that the UE has already been admitted by the one-stage admission control in the target eNB, procedure code=0 and type of message="successful outcome" is used, and for a HO request that tells the target RN that the UE has already been rejected by the target eNB, procedure code=0 and type of message="unsuccessful outcome" is used (so, for example, the target RN may know upon receiving a certain number of messages of this type, that lots of handovers to it are failing, and may be do some access link congestion control, or send update information about the access link capacity to the target eNB).

Figure 12:
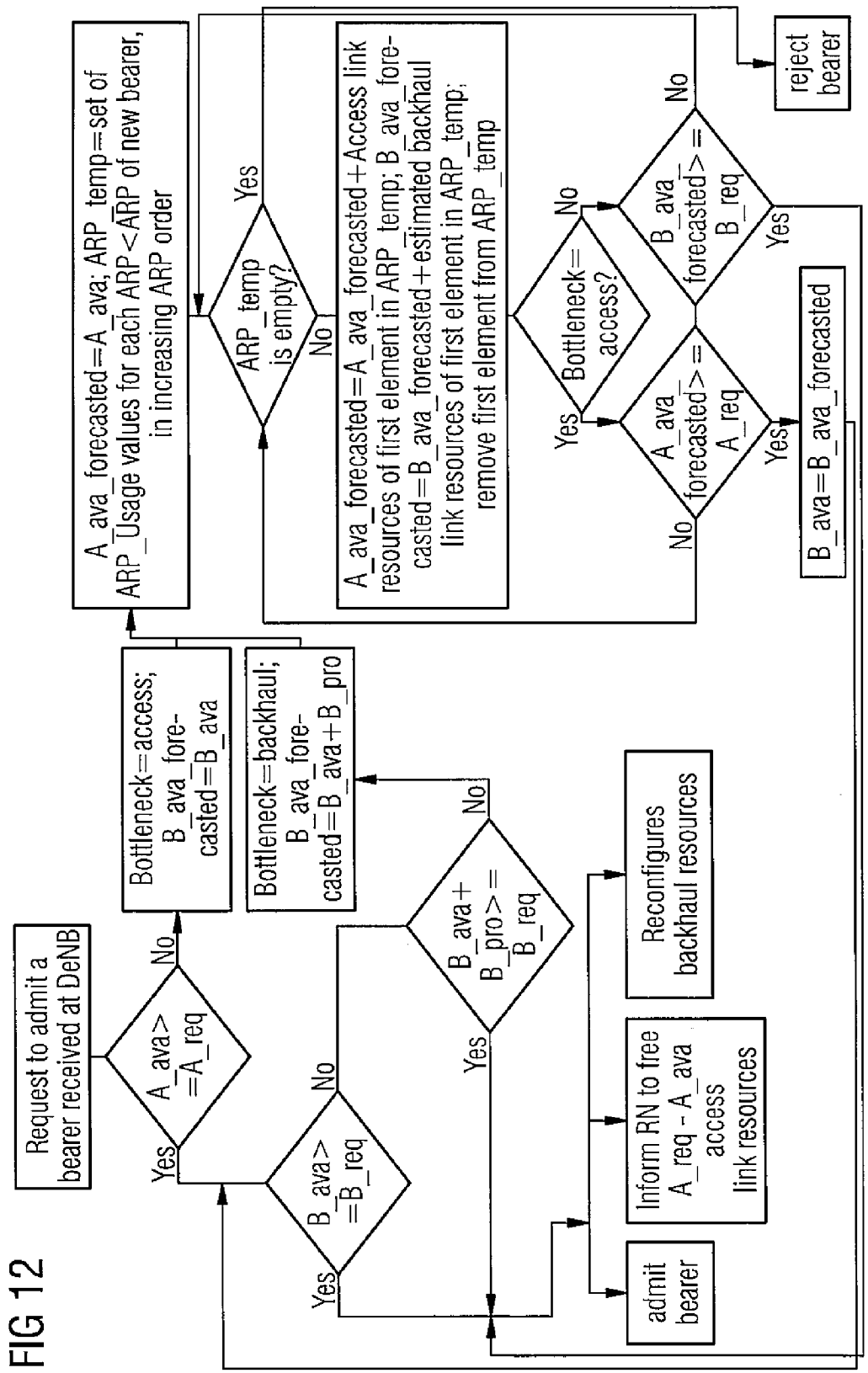
FIG. 12 shows a schematic flow chart of one-stage admission control in a relay architecture of second category according to exemplary embodiments of the present invention.

The combined bearer admission control of step 5 in FIG. 11 is explained below, while specific operations thereof are also depicted in FIG. 12. FIG. 12 shows a schematic flow chart of one-stage admission control in a relay architecture of second category according to exemplary embodiments of the present invention.

The one-stage admission control procedure for category 2 can be performed in the same or at least a similar way as that for category 1 described above. A difference resides in that the admission control is performed at the base station instead of the relay node. However, since the target eNB is aware of the individual UE EPS bearers and it is the entity that is first receiving the bearer admission request, performing the combined bearer admission control solely at the DeNB is beneficial in terms of delay and signaling overhead.

For the target eNB to be able to perform the admission control both on the backhaul and access links, it requires up-to-date information about the resource utilization on the access links of its RNs. This can be realized with a periodic or event triggered update procedure where the RNs inform their donor base station (DeNB) about the resource usage in their access links. This information is different from that being designated by A_ava for category 1 as it may not contain not only the available access link resources that can be made readily available to new/requested bearers by the RN, but also detailed information such as the access link utilization grouped by ARP values.

From this detailed (or summarized) information about the access link usage, the target eNB may be able to estimate the total access link resources that can become available, which is the sum of the already free access link resources and the access link resources that can be made available by dropping bearers of lower ARP than the bearers being admitted in the case of access link resource limitations. That is, the target eNB will be aware of the "actual" as well as the "possible" access link resources. In addition to the terms defined above, an additional parameter is designated as A_ARP_usage[i], which refers to the access link utilization for a given ARP value.

When a request for bearer admission is received at the target eNB, the target eNB first checks to see if there are enough available resources in the access link of the RN, using the latest A_ava reported by the RN. If not, the target eNB checks if enough resources can be freed by dropping bearers with ARP values lower than that of the new bearer (using the detailed information on resource usage per ARP included in the parameter A_ARP_usage). If so, the available backhaul capacity is also updated to reflect the backhaul resources to be freed. However, if dropping lower ARP bearers is still not sufficient to guarantee the access link resources, the bearer will be rejected immediately.

After a successful access link admission, the target eNB continues the admission in the backhaul link. This is done by checking if the free backhaul resources (for example, the updated B_ava in case the access link admission required the dropping of low ARP bearers) are enough to accommodate the requested bearer. If so, the bearer can be admitted immediately. If the free backhaul resources are not sufficient, the target eNB checks if the additional required backhaul resources can be fulfilled by the promised backhaul resources. If the backhaul resources are still not sufficient, the target eNB checks to see if the required backhaul resources can be made available by dropping lower ARP bearers on the access link. If not, the requested bearer will be rejected.

If the admission decision is positive, the target eNB can then reconfigure the backhaul resources, and also communicate to the RN the required information to drop lower ARP bearers, if any, which might have to be dropped to guarantee the required resources in the access or/and backhaul links. This information can e.g. be conveyed by forwarding the handover request. It should be noted that this message however is not in the critical path i.e. it does not contribute to the handover delay.

For the relay architecture of the second category, the relay nodes are specifically configured to accomplish up-to-date distribution of information on the access resources towards its controlling (donor) base station, and the base station is specifically configured to understand this access information, and to inform its subordinate relay nodes when the bearer to be admitted needs extra access resources.

The exchange of corresponding information on backhaul/access link resource usage and "promised resources" may be accomplished by a modified radio resource control including a corresponding information element to be used to this end.

In the following, an exemplary but non-limiting variety of further developments, modifications, details, or the like of the above-described one-stage admission control mechanisms are described.

It is noted that, in the context of bearer admission requests for a plurality of bearers, for example in the context of a handover request of a UE having multiple bearers, it is to be noted combined bearer admission control for the multiple bearers may include a prioritization of the bearers requested for admission (e.g. according to ARP) and an execution of the combined bearer admission control in the order of prioritization of the bearers. Such prioritization may be made separately or commonly for the bearer admission on the access link and the backhaul link, and may be effected at the respective network entity (i.e. the base station or eNB for the relay architecture of the second category and/or the relay node for the relay architecture of the first category).

For example, when assuming that a UE having three bearers (b1, b2, b3) is to be handed over in a relay architecture of the second category (as illustrated in FIGS. 11 and 12), the above-described process may be enhanced as follows. When the handover request is received at the target eNB the target eNB prioritizes the bearers according to the ARP, for example in the order b2, b1, b3. when trying to admit bearer b2 on the access link, then bearer b1 on the access link, and then bearer b3 on the access link (each time noting what bearers, if any, have to be dropped to accommodate each bearer, and updating free backhaul resources), a situation may arise that bearer b2 is to be rejected and bearer b3 may be admitted (because bearer b2, though it has a higher ARP, requires too much resource that cannot be freed by dropping lower ARP bearers). Once the admission of the three bearers is completed on the access link, the bearer list of the ones admitted on the access link may be passed on to the admission on the backhaul link. Then, in the backhaul, the admission control may be proceeded in the same manner as for the access link admission control in terms of an order of bearers being handled.

It is noted that, in the context of bearer admission requests for a plurality of bearers, a partial admission may also be accomplished.

It is noted that, according to embodiments of the present invention, information on available resources on any one of the relevant links may, in equal measure, comprise an actual (single) value of available resources or a range of available resources wherein an actual value of available resources lies within said range. Using a single (actual) value may provide a higher accuracy and reliability for bearer admission control, while using a resource range may provide for less signaling traffic and a reduced need for load measurements on respective links.

In case information on available resources on the access link and/or the backhaul link comprise a range of resources, respective resource information are obtained (i.e. sent by the network entity capable of measuring resources on the respective link and/or received by the cooperating network element) only when an actual value of available resources on said access link and/or backhaul link is outside said range, and/or sufficiency of respective resources is checked and bearer admission on the respective link is executed on the basis of said range.

For example, reference is made to the scenario according to FIG. 11 for explanatory purposes of using a resource range. In the one-stage approach, there is the issue that it may be needed to signal all the changes in load (here, on the access link) between involved network entities, e.g. from the target relay node to the target DeNB. This may cause some unnecessary signaling traffic. Instead of signaling any actual (single) value which is needed frequently due to permanently varying load conditions, embodiments of the present invention are configured to use a specific range of available (or admissibly usable) resources, which could be determined statically or dynamically. Then, it is only needed to be signaled that the available resources are within this specific range, and an update is needed to be sent only if the actual value of available resources moves out of this specific range. Then, the network entity receiving such resource information may execute bearer admission on the basis thereof (instead of one actual resource value). In the present example, the target DeNB may reject any bearer admission that requires more than the upper limit of that range (in case free resources after admission of all requested bearers is below the lower limit of that range), while it may accept any bearer admission that requires less than the lower limit of that range (in case free resources after admission of all requested bearers is above the upper limit of that range). When the requested bearer admission, i.e. the need of a resource amount of bearers to be admitted (or free resources after admission of all requested bearers), falls within that range, the target DeNB cannot finally decide on whether or not bearer admission is possible as requested. That is, the target DeNB may fall back to the above-described two-stage admission control operation by sending e.g. the HO request to the target relay node, or may at least request an ad-hoc report whether the target relay node has the required resources on the respective link. Then, the target relay node executed bearer admission on the access link (on behalf of the target DeNB), since the target DeNB is not capable of doing so in a reliable manner, as described herein. In this example, by using a resource range, the load for measurements on the access link may be reduced, and a situation may be solved or at least relaxed when the relay node actually has less resources than anticipated by the target base station.

In brief, the relay node may communicates a range of available resources (with the current value being within the range) that the base station can use for the admission, and the relay node may update the information on available resources (i.e. the range) only when the available resources are out of the previously communicated range. Then, the base station may, if the free capacity (i.e. the amount of resources remaining, if any, after the bearer(s) are admitted, based on the latest load information on the other link, i.e. backhaul capacity for category 1 and the access link for category 2) is above the upper limit of the range, execute one-stage admission control, and/or may, if the free capacity is within the range, fall back to two-stage admission control or ask for a current value of available resources from the relay node, and/or may, if the free capacity is below the lower limit of the range, autonomously reject the bearer(s).

The above-outlined concept of using a resource range as information on available resources on a respective link, may be applied to access and/or backhaul links, and may be realized by the respective relay node and/or base station depending on the underlying relay architecture and link in question. That is, besides being realized by the target DeNB with respect to access link resources in the exemplary scenario of FIG. 11, it may also be realized by the target RN with respect to backhaul link resources in the exemplary scenario of FIG. 9.

It is noted that a situation may arise (though with a rather low probability) that just after a bearer is admitted in one RN and before the updated backhaul resource availability is broadcasted by the eNB, another RN admits a bearer assuming the promised backhaul resources which are out-of-date in the meantime. The eNB, when getting a resource utilization update from a RN that indicates such a problem (which can be identified because the promised backhaul resources to be broadcasted will be negative), can send a message to the responsible RN indicating this problem, and the RN can revert the bearer admission process (i.e. hand over the bearer to the source node in the case of handover) or drop the bearer that was just admitted (or a bearer with lower ARP) based on the out-of-date backhaul resources.

It is noted that a situation may arise (though with a rather low probability) that a handover acknowledgment (or, in general, a bearer admission acknowledgment), which is sent from a target base station such as DeNB towards a source such as the UE to be handed over, reaches the source such as the UE before the target relay node is aware of the respective handover process, i.e. before the target base station has forwarded to the target relay node and/or before the target relay node is aware of the fact that the UE has been handed over to it (and admission control is successfully completed). This may for example be due to a very low percentage allocation in the backhaul between the target relay node and the target base station, or some other reason causing delay in the respective notification of the target relay node. If so, when the UE tries to synchronize with the target relay node, the target relay node is not aware of this UE at that point in time. In this case, according to embodiments of the present invention, the target relay node may ask for confirmation from the target base station, if it has admitted the UE that is trying to synchronize with it, and proceed with serving the UE when admission thereof is confirmed from the target base station.

It is noted that, according to embodiments of the present invention, load measurements on the backhaul link may be executed by the target base station. Such load measurements are generally applicable to both above approaches (including two-stage approach and one-stage approach) and for both above relay architectures, while being particularly effective in the one-stage approach for the relay architecture of the first category. Namely, the target base station such as DeNB may execute load measurements on available backhaul resources, i.e. the subframes available for the backhaul link. Hence, such load measurements differ from a normal load measurement approach which also measures on non-backhaul subframes, while these are useless for the backhaul link and determination of available backhaul resources.

It is noted that, if any resource partitioning is required as a result of admission control during UE handover preparation or the like, it can be performed while the handover of the UE is being executed. Thus, the chances that it will be finalized and all the required resources are ready to be used are increased when the handover is completed, thus creating no further interruption in the traffic flow of any of the UE bearers.

It is noted that, as described above, a situation may arise in both relay architectures that there are not sufficient resources on the access link. In such a situation of resource limitation on the access link, the bearer admission control may be detailed as follows.

For example, it is assumed that bearers A, B and C already exist, and a new bearer D is requested to be admitted. If bearer D has a higher priority, i.e. a higher ARP, than that of bearers A and B, and if the resources utilized by the two existing bearers A and B are sufficient to admit the requested bearer D, these two existing bearers A and B are marked for dropping in the bearer admission control for the access link, and the overall procedure continues with the bearer admission control for the backhaul link. That is, the existing bearers with sufficient resources for admission of the requested bearer are not dropped immediately because the backhaul admission can still fail (which would cause unnecessary delay and signaling overhead when the existing bearers would already have been dropped on the access link and these bearers would have been dropped unnecessarily).

Apart from the access link resources to be freed by these two existing bearers, also the backhaul resources may be estimated, which will be freed if these two low ARP bearers are dropped. That is, an amount of B_ava backhaul resources are available at the start of the admission control, and an amount of B_ava+B__2bfreed may be totally made available by dropping the existing bearers, where B__2bfreed is the estimated backhaul resources to be freed if the low ARP bearers are dropped. Accordingly, the backhaul admission is performed on the basis of this amount of resources which may be made available as well as the promised backhaul resources recently being broadcasted by the DeNB (i.e. an amount of B_pro).

Then, exemplarily relating to the case of FIG. 9, the backhaul admission is performed as follows.

First, it is checked whether B_req<=B_ava+B__2bfreed holds. If so, the lower ARP bearers are dropped, and the requested bearer is admitted. If not, it is checked whether B_req<=B_ava+B__2bfreed+B_pro holds. If so, the lower ARP bearers are dropped, the requested bearer is admitted, and it is communicated to the DeNB that extra resources in the amount of B_req−B_ava−B__2bfreed are used on the backhaul link so that the DeNB is aware of this new resource utilization and can broadcast the new backhaul resources information e.g. to its subordinate relay nodes. If not, the requested bearer is safely rejected, and the lower ARP bearers are left untouched.

It is noted that, as previously mentioned, the admission of a bearer according to embodiment of the present invention is relevant to both handovers and bearer setups/modifications. During a handover, the QoS information of all the active bearers of the UE is communicated to the target RN and the handover request message generated after the admission control process can tell which bearers can be handed over to the target RN.

It is noted that, in a relay architecture of the second category, when a UE is being handed over between two RNs controlled by the same DeNB, the backhaul resources to be freed from the source RN due to the handing over of the UE may be considered as part of the available backhaul resources by the DeNB when it performs the admission control. In a relay architecture of the first category, a similar effect may be achieved, if the target RN knows that the source RN is attached to the same DeNB as itself. Then, the target RN knows the source RN identity (as it will have to send the handover acceptance message to that RN), so all extra information it requires is the attachment of the source RN. It can get this information in advance either by a specific information procedure with that RN or with its DeNB. Then, the RNs may tell each other, to which DeNB they are attached, e.g. during setup of a corresponding signaling connection such as e.g. an X2 connection between them, or the DeNB may inform the RN about the other RNs it serves (at least the ones that are in the vicinity of the relevant RN). Alternatively, a central network node may provide this information, e.g. an O&M center (operation and maintenance center) or a Net-Act node (network optimization node). Furthermore, the available backhaul throughput may also depend on the link quality of the link between the RN and the DeNB. Then, during handover, even if backhaul resources will be freed from the link from the source RN to the DeNB, these resources may not be sufficient on the link from the target RN to the DeNB, if the latter link is worse than the previous one, e.g. because the target RN is further away from the DeNB than the source RN. This can also be notified to the target RN, i.e. the target RN may receive information on the relative link quality of the two links. Then it can estimate whether the resources freed on the source RN plus any free resources or to be freed resources, are sufficient to accommodate the backhaul traffic after handover.

It is noted that, in a one-stage admission control process for a relay architecture of the second category, a handover request is still to be forwarded towards the target RN because after all the target RN should know which user is going to be handed over to it. This information may be sent in parallel with the handover request acknowledgment sent towards the source RN, and may, thus, avoid a latency problem of extra delay as well as an overhead problem of extra signaling.

It is noted that, according to embodiments of the present invention, certain modifications may be introduced in the context radio resource control, as detailed below.

When a RRC connection reconfiguration message that contains mobility control information is sent towards the UE (as e.g. depicted as message 7 in FIGS. 4, 5, 9 and 11), it should include necessary information for the UE to start communicating with the target RN. The required information to be included in the mobility control information element includes the physical cell ID (identifier), the C-RNTI (cell radio network temporary identifier) and handover expiration timer values. In a relay architecture of the second category, since the handover request acknowledgment that is reaching the source RN is originating from the target DeNB instead of the target RN, these information are to be cached in the target DeNB. The physical cell ID and the handover expiration timer values are rather stable values, and as such can be cached easily at the target DeNB, while a dynamic set of possible C-RNTI values to be used for UEs being handed over may be communicated to the target DeNB by the target RN (using separate messaging and/or along with the access link resource utilization information).

Thus, the target DeNB can cache and include the required part of the mobility control information on behalf of the target RN (during or at least in the context of bearer admission control according to embodiments of the present invention). Among the optional parameters, there is one that can be very useful, which gives a preamble to be used for dedicated Random Access Channel (RACH) access. If this preamble is not given, the UE has to rely on contention based random access, which might delay the overall handover process as random access is required at the beginning of connection setup.

As such, according to embodiments of the present invention, the target DeNB may be configured to also cache a set of preambles, for each of the cached C-RNTI.

The other optional parameters that can be included in the mobility control information are mostly dealing with common or dedicated information such as UL (uplink) power control. This information can be communicated to the UE later on after handover (or, generally speaking, bearer admission control) is finalized, and to begin with, the UE has to be connected with the RN for considerable time before proper values can be set for these parameters. As such, the performance of the UE is not highly impacted by the omission of the optional parameters in the mobility control information element. Hence, according to embodiments of the present invention, the target DeNB may be configured to omit caching of such optional parameters.

The above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIG. 13, while for the sake of brevity reference is made to the detailed description of respective corresponding methods and operations according to FIGS. 8 to 12, respectively.

Figure 13:
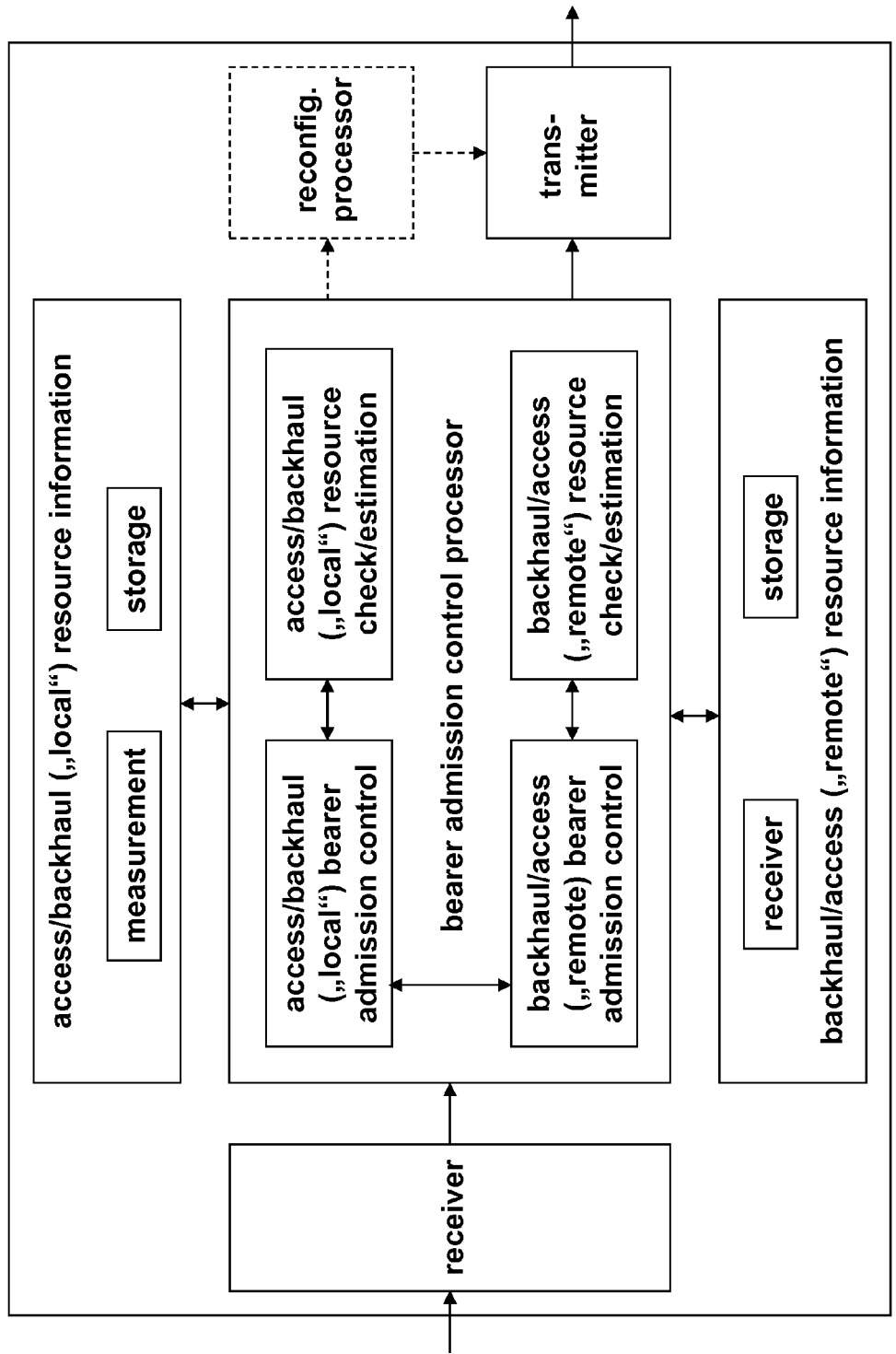
FIG. 13 shows a schematic block diagram of an apparatus being configured for one-stage admission control according to exemplary embodiments of the present invention.

In FIG. 13 below, the solid line blocks are basically configured to perform respective operations as described above. The entirety of solid line blocks are basically configured to perform the methods and operations as described above, respectively. With respect to FIG. 13, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 13, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 13 shows a schematic block diagram of an apparatus being configured for one-stage admission control according to exemplary embodiments of the present invention. Depending on the underlying relay architecture, the thus described apparatus may be implemented by or at a relay node or a base station, as described above.

In case of the relay architecture of the first category, the apparatus is a relay node (e.g. target RN), the local link is the access link, and the remote link is the backhaul link. In case of the relay architecture of the second category, the apparatus is a base station (e.g. DeNB or target eNB), the local link is the backhaul link, and the remote link is the access link.

According to FIG. 13, the apparatus according to exemplary embodiments of the present invention is configured to perform a procedure as described in conjunction with FIGS. 8 to 12. Therefore, while basic operations are described hereinafter, reference is made to the above description for details.

According to an exemplary embodiment depicted in FIG. 13, the thus depicted apparatus a receiver and a bearer admission control processor. The receiver is preferably configured to receive a bearer admission request of at least one bearer in a relay-enhanced access network, said at least one bearer consisting of a bearer on an access link between a user equipment and a relay node and a bearer on a backhaul link between said relay node and a base station, thus representing means for receiving a bearer admission request. The bearer admission control processor is preferably configured to execute a combined bearer admission control of said at least one bearer, including a bearer admission control on the access link and a bearer admission control on the backhaul link, thus representing means for executing a combined bearer admission control, as outlined with reference to step 5 of FIGS. 9 and 11 in connection with FIGS. 10 and 12, respectively.

The bearer admission control processor, for bearer admission control on said access link, may be configured to obtain information on available resources on said access link, and check whether sufficient access link resources for admitting the at least one requested bearer on said access link are available and/or are to be made available by dropping one or more existing bearers on the access link having a lower priority than at least one bearer requested for admission and/or by dropping one or more existing bearers on the backhaul link having a lower priority than at least one requested bearer. The obtaining may be accomplished by specific obtaining means, and the checking may be accomplished by specific checking (estimating) means. In case of a relay architecture of the first category, access link resources are deemed to be local, wherein the obtaining may include measuring or locally retrieving from a storage. In case of a relay architecture of the second category, access link resources are deemed to be remote, wherein the obtaining may include receiving from a corresponding remote network entity.

The bearer admission control processor, for bearer admission control on said access link, may be further configured to, when sufficient access link resources are not available, but are to be made available, mark those one or more bearers to be dropped, admit the at least one requested bearer on the access link, and update resources on the backhaul link which are to be freed by the dropping, and/or, when sufficient access link resources are available and/or are to be made available, admit the at least one requested bearer on the access link, and/or, when sufficient access link resources are not available, and are not to be made available, reject admission of the at least one requested bearer.

The bearer admission control processor, for bearer admission control on said backhaul link, may be configured to obtain information on available resources on the backhaul link, and check whether sufficient backhaul link resources for admitting the at least one requested bearer on the backhaul link are available and/or are to be made available by reconfiguring backhaul resources after completion of the bearer admission on the backhaul link and/or by dropping one or more existing bearers on the access link having a lower priority than at least one bearer requested for admission and/or by dropping one or more existing bearers on the backhaul link having a lower priority than at least one requested bearer requested. The obtaining may be accomplished by specific obtaining means, and the checking may be accomplished by specific checking (estimating) means. In case of a relay architecture of the first category, backhaul link resources are deemed to be remote, wherein the obtaining may include receiving from a corresponding remote network entity. In case of a relay architecture of the second category, backhaul link resources are deemed to be local, wherein the obtaining may include measuring or locally retrieving from a storage.

The bearer admission control processor, for bearer admission control on said backhaul link, may be further configured to, when sufficient backhaul link resources are not available, and are not to be made available by the reconfiguring, but are to be made available by the dropping, drop the one or more existing bearers on the access link and drop the one or more existing bearers on the backhaul link, admit the at least one requested bearer on the backhaul link, and/or, when sufficient backhaul link resources are available and/or are to be made available by the reconfiguring, admit the at least one requested bearer on the backhaul link, and/or, when sufficient backhaul link resources are not available, and are not to be made available, reject admission of the at least one requested bearer.

The bearer admission control processor, or specifically configured checking/estimating means, may be configured to estimate an amount of access/backhaul link resources being able to be made available by dropping one or more existing bearers on the backhaul/access link having a lower priority than at least one bearer requested for admission.

In case information on available resources on the access link and/or the backhaul link comprise a range of resources, as explained above, the bearer admission control processor may be configured to obtain respective resource information only when an actual value of available resources on said access link and/or backhaul link is outside said range, and/or to check sufficiency of respective resources and execute bearer admission on the respective link on the basis of said range, as outlined above.

According to embodiments of the present invention, when the apparatus is operable as or at a base station such as the target eNB according to FIG. 11, the apparatus may be configured to receive (e.g. by the receiver) from said relay node and cache (e.g. by a non-shown storage or cache which may be universally usable or dedicated for mobility control information) mobility control information relating to a user equipment to be handed over, and to send (e.g. by the transmitter) a modified bearer admission request (e.g. HO request) including a result of bearer admission control at said base station (which may e.g. also relate to mobility control of said user equipment) to said relay node (e.g. the target relay node in case of a handover process).

In case of the apparatus being realized by or at a relay node of a relay architecture of the first category, the apparatus may further comprise a transmitter configured to send an update message including a result of bearer admission control for the access link and/or the backhaul link to the base station, thus representing means for sending an update or result message.

In case of the apparatus being realized by or at a base station of a relay architecture of the second category, the apparatus may further comprise a transmitter configured to send an update message including a result of bearer admission control for the access link and/or the backhaul link to the relay node, thus representing means for sending an update or result message. And, the apparatus may further comprise a reconfiguration processor configured to reconfigure backhaul resources after completion of the bearer admission on said backhaul link, thus representing means for reconfiguring resources, especially those resources having been subject to bearer admission.

Further, the bearer admission control processor may be configured to execute, for each one of the at least one requested bearer, the bearer admission control on the access link and the bearer admission control on said backhaul link in an arbitrary order. In case a bearer admission for more than one bearer is requested, the bearer admission control processor may be configured to, prioritize the requested bearers and execute the combined bearer admission control in the order of prioritization of the bearers, and/or to execute the combined bearer admission control for the requested bearers either in a successive manner for one bearer at a time or in a joint manner for more than one or all of the bearers at a time. In the joint manner, for example, a combined bearer admission could be accomplished for all of the requested bearers together on one or both of the access link and the backhaul link (irrespective of the order of whether access link admission and backhaul link admission are effected in any arbitrary order or in parallel).

According to exemplarily embodiments of the present invention, although not illustrated in detail, there is provided an apparatus representing a functional complement to the apparatus executing bearer admission described above. Such apparatus may be implemented by or at a base station in a relay architecture of the first category, and by or at a relay node in a relay architecture of the second category. Such apparatus according to exemplary embodiments of the present invention is configured to perform a procedure as described in conjunction with FIGS. 9 and 11, as regards the perspective of a remote network entity. Therefore, reference is made to the above description for details.

According to exemplarily embodiments of the present invention, a system may comprise any conceivable combination of the thus depicted apparatus (such as a RN or (D)eNB) and other network elements (such as a serving base station or subordinate and/or other RNs), which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

Generally, for the purpose of the present invention as described herein above, it should be noted that method steps and functions likely to be implemented as software code portions and being run using a processor at one of the entities, a network element, or a terminal (as examples of devices, apparatuses and/or modules thereof, or as examples of entities including apparatuses and/or modules thereof), are software code independent and can be specified using any known or future developed programming language, such as e.g. Java, C++, C, and Assembler, as long as the functionality defined by the method steps is preserved;

generally, any method step is suitable to be implemented as software or by hardware without changing the idea of the invention in terms of the functionality implemented;

method steps, functions, and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

The present invention also covers any conceivable combination of method steps and operations described above, and any conceivable combination of nodes, apparatuses, modules or elements described above, as long as the above-described concepts of methodology and structural arrangement are applicable.

There are provided measures for enhanced admission control in relay-enhanced access networks, said measures exemplarily comprising receipt of at least one bearer admission request of a bearer in a relay-enhanced access network, said at least one bearer consisting of a bearer on an access link between a user equipment and a relay node and a bearer on a backhaul link between said relay node and a base station, and execution of a combined bearer admission control of said at least one bearer at one of said relay node and said base station, including a bearer admission control on the access link and a bearer admission control on the backhaul link. Said measures may exemplarily be applied for enhancing admission control in relay-enhanced LTE and LTE-Advanced access networks.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

The invention claimed is:

1. A method comprising
receiving a bearer admission request of at least one bearer at one of a relay node and a base station in a relay-enhanced access network, said at least one bearer consisting of a bearer on an access link between a user equipment and said relay node and a bearer on a backhaul link between said relay node and said base station,
executing a bearer admission control of said at least one bearer on a first link of said at least one bearer at the one of said relay node and said base station,
identifying a set of bearers among said at least one bearer, which are admitted on said first link as a result of said execution of said bearer admission control at the one of said relay node and said base station, and
based on the identifying, determining that said identified set of bearers can be supported by a second link of said at least one bearer and transmitting a modified bearer admission request of said identified set of bearers for execution of a bearer admission control on the second link of said at least one bearer to the one of said relay node and said base station when at least one bearer is identified to be admitted on said first link, else
if it is determined that said identified set of bearers are not supported by the second link, transmitting a bearer admission request acknowledgment indicating rejection of the bearer admission request of said at least one bearer.

2. The method according to claim 1, upon transmitting said modified bearer admission request, further comprising
receiving a bearer admission request acknowledgment from the one of said relay node and said base station, including information on bearers among said identified set of bearers, which are admitted on said second link as a result of the execution of said bearer admission control at the one of said relay node and said base station, and
transmitting a bearer admission request acknowledgment indicating admission of bearers on both said first and second links in accordance with said information on bearers.

3. The method according to claim 1, wherein said method is operated at said relay node, said first link comprises said access link and said second link comprises said backhaul link.

4. The method according to claim 3, wherein said bearer admission request acknowledgment indicating rejection of the bearer admission request of said at least one bearer is transmitted to the base station.

5. The method according to claim 1, wherein said method is operated at said base station, said first link comprises said backhaul link and said second link comprises said access link.

6. The method according to claim 5, wherein said bearer admission request acknowledgment indicating rejection of the bearer admission request of said at least one bearer is transmitted to another base station from which a handover of the user equipment is to be performed.

7. The method according to claim 1, said bearer admission control comprising
obtaining information on available resources on said first link, and
checking whether sufficient access link resources for admitting said at least one bearer on said first link are available or are to be made available by at least one of dropping one or more existing bearers on said first link having a lower priority than at least one bearer requested for admission and by dropping one or more existing bearers on said second link having a lower priority than at least one bearer requested for admission.

8. The method according to claim 1, wherein, when a bearer admission for more than one bearer is requested, said method further comprises at least one of
prioritizing the bearers requested for admission and executing the bearer admission control on said first link in the order of prioritization of the bearers, and
the bearer admission control on said first link for the bearers requested for admission is executed either in a successive manner for one bearer at a time or in a joint manner for more than one or all of the bearers at a time.

9. The method according to claim 1, wherein said bearer admission request comprises or is comprised in at least one of a handover request, a bearer setup request and a bearer modification request.

10. The method according to claim 1, wherein the bearer admission request is a handover request and wherein identifying a set of bearers further comprises identifying a list of backhaul-admitted bearers that are bearers remaining after bearers which cannot be admitted in the backhaul are removed from an original list of bearers in the handover request, and wherein transmitting further comprises sending a modified handover request including the list of backhaul-admitted bearers to said relay node.

11. The method according to claim 1, wherein the determining that said identified set of bearers can be supported by the second link comprises determining one of that a guaranteed bit rate of said identified set of bearers is supported by the second link, and that said identified set of bearers is not associated with a guaranteed bit rate.

12. An apparatus comprising
at least one processor; and
at least one memory including computer program code, where the at least one memory and the computer program code are configured, with the at least one processor, to cause the apparatus to at least:
receive a bearer admission request of at least one bearer at one of a relay node and a base station in a relay-enhanced access network, said at least one bearer consisting of a bearer on an access link between a user equipment and said relay node and a bearer on a backhaul link between said relay node and said base station,
execute a bearer admission control of said at least one bearer on a first link of said at least one bearer at the one of said relay node and said base station, and to identify a set of bearers among said at least one bearer, which are admitted on said first link as a result of said execution of said bearer admission control at the one of said relay node and said base station,
based on the identifying, determine that said identified set of bearers can be supported by a second link of said at least one bearer and transmit a modified bearer admission request of said identified set of bearers for execution of a bearer admission control on the second link of said at least one bearer to the one of said relay node and said base station when at least one bearer is identified to be admitted on said first link, else
if it is determined that said identified set of bearers are not supported by the second link, transmit a bearer admission request acknowledgment indicating rejection of the bearer admission request of said at least one bearer.

13. The apparatus according to claim 12, wherein the at least one memory including the computer program code is configured with the at least one processor to cause the apparatus, upon transmitting said modified bearer admission request, to:
  said receiver is configured to receive a bearer admission request acknowledgment from the one of said relay node and said base station, including information on bearers among said identified set of bearers, which are admitted on said second link as a result of the execution of said bearer admission control at the one of said relay node and said base station, and
  said transmitter is configured to transmit a bearer admission request acknowledgment indicating admission of bearers on both said first and second links in accordance with said information on bearers.

14. The apparatus according to claim 12, wherein said apparatus is operable at said relay node, said first link comprises said access link and said second link comprises said backhaul link.

15. The apparatus according to claim 14, wherein the at least one memory including the computer program code is configured with the at least one processor to cause the apparatus to transmit said bearer admission request acknowledgment indicating rejection of the bearer admission request of said at least one bearer to the base station.

16. The apparatus according to claim 12, wherein said apparatus is operable at said base station, said first link comprises said backhaul link and said second link comprises said access link.

17. The apparatus according to claim 16, wherein the at least one memory including the computer program code is configured with the at least one processor to cause the apparatus to transmit said bearer admission request acknowledgment indicating rejection of the bearer admission request of said at least one bearer to another base station from which a handover of the user equipment is to be performed.

18. The apparatus according to claim 12, wherein the at least one memory including the computer program code is configured with the at least one processor to cause the apparatus to
  obtain information on available resources on said first link, and
  check whether sufficient access link resources for admitting said at least one bearer on said first link are available or are to be made available by at least one of dropping one or more existing bearers on said first link having a lower priority than at least one bearer requested for admission and by dropping one or more existing bearers on said second link having a lower priority than at least one bearer requested for admission.

19. The apparatus according to claim 12, wherein the at least one memory including the computer program code is configured with the at least one processor to cause the apparatus to, when a bearer admission for more than one bearer is requested, at least one of
  prioritize the bearers requested for admission and execute the bearer admission control on said first link in the order of prioritization of the bearers, and
  execute the bearer admission control on said first link for the bearers requested for admission either in a successive manner for one bearer at a time or in a joint manner for more than one or all of the bearers at a time.

20. The apparatus according to claim 12, wherein said bearer admission request comprises or is comprised in at least one of a handover request, a bearer setup request and a bearer modification request.

21. The apparatus according to claim 12, wherein the bearer admission request is a handover request and wherein the bearer admission control processor is further configured to identify a set of bearers further comprises identifying a list of backhaul-admitted bearers that are bearers remaining after bearers which cannot be admitted in the backhaul are removed from an original list of bearers in the handover request, and wherein the at least one memory including the computer program code is configured with the at least one processor to cause the apparatus to send a modified handover request including the list of backhaul-admitted bearers to said relay node.

22. A non-transitory computer-readable storage medium on which software code portions are embodied for use with a processor, the software code portions executed by the processor to perform operations comprising:
  receiving a bearer admission request of at least one bearer at one of a relay node and a base station in a relay-enhanced access network, said at least one bearer consisting of a bearer on an access link between a user equipment and said relay node and a bearer on a backhaul link between said relay node and said base station,
  executing a bearer admission control of said at least one bearer on a first link of said at least one bearer at the one of said relay node and said base station,
  identifying a set of bearers among said at least one bearer, which are admitted on said first link as a result of said execution of said bearer admission control at the one of said relay node and said base station,
  based on the identifying, determining that said identified set of bearers can be supported by a second link of said at least one bearer and transmitting a modified bearer admission request of said identified set of bearers for execution of a bearer admission control on the second link of said at least one bearer to the one of said relay node and said base station when at least one bearer is identified to be admitted on said first link, else
  if it is determined that said identified set of bearers are not supported by the second link, transmitting a bearer admission request acknowledgment indicating rejection of the bearer admission request of said at least one bearer.

23. The non-transitory computer-readable storage medium according to claim 22, wherein the bearer admission request is a handover request and wherein identifying a set of bearers further comprises identifying a list of backhaul-admitted bearers that are bearers remaining after bearers which cannot be admitted in the backhaul are removed from an original list of bearers in the handover request, and wherein transmitting further comprises sending a modified handover request including the list of backhaul-admitted bearers to said relay node.

* * * * *